US006226742B1

(12) United States Patent
Jakubowski et al.

(10) Patent No.: US 6,226,742 B1
(45) Date of Patent: May 1, 2001

(54) CRYPTOGRAPHIC TECHNIQUE THAT PROVIDES FAST ENCRYPTION AND DECRYPTION AND ASSURES INTEGRITY OF A CIPHERTEXT MESSAGE THROUGH USE OF A MESSAGE AUTHENTICATION CODE FORMED THROUGH CIPHER BLOCK CHAINING OF THE PLAINTEXT MESSAGE

(75) Inventors: Mariusz H. Jakubowski, West Orange, NJ (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/062,836

(22) Filed: Apr. 20, 1998

(51) Int. Cl.[7] ....................................................... H04L 9/00
(52) U.S. Cl. ............................................. 713/170; 380/37
(58) Field of Search .................................... 713/170, 181; 380/28, 37, 259

(56) References Cited

U.S. PATENT DOCUMENTS 5,673,319 * 9/1997 Bellare et al. ........................ 713/181

OTHER PUBLICATIONS

Schneier, Bruce. Applied Cryptography: Protocols, Algorithms, and Source Code in C. Oct. 1995. p. 398.*
U.S. application No. 09/062,837, Mariusz Jakubowski, filed Apr. 20, 1998.
K. Kaukonen et al, "A Stream Cipher Encryption Algorithm 'Arcfour'", *IETF Internet Draft, Network Working Group*, Jul. 1997, pp. 1–11.
W. A. Simpson, "ESP with Cipher Block Checksums {CBCS)", *IETF Internet Draft, Network Working Group*, Jul. 1997, pp. 1–9.
R. Thayer, "A Stream Cipher Encryption Algorithm ", *IETF Internet Draft, Network Working Group*, Apr. 1997, pp. 1–8.
B. Schneier, *Applied Cryptography, Second Edition*, pp. 197–198 (© 1996, J.W. Wiley & Sons, Inc.).
G. J. Simmons (ed.), *Contemporary Cryptology—The Science of Information Integrity*, Chapter 2, "Block Ciphers and Stream Ciphers", pp. 13–112 ( © 1992, IEEE Press).
C. H. Meyer et al, *Cryptography: A New Dimension in Computer Data Security—A Guide for the Design and Implementation of Secure Systems*, Chapter 2, "Stream Ciphers", pp. 65–134, © 1982, John Wiley & Sons, Inc.).

* cited by examiner

*Primary Examiner*—Gail Hayes
*Assistant Examiner*—Christopher M. Tucker
(74) *Attorney, Agent, or Firm*—Michaelson & Wallace; Peter L. Michaelson

(57) ABSTRACT

A cryptographic technique that not only provides fast and extremely secure encryption and decryption but also assures integrity of a ciphertext message. This technique involves, during message encryption: generating, in response to an incoming plaintext message, an intermediate stream—such as by chaining the message, wherein a predefined portion of the intermediate stream defines a message authentication code (MAC); inserting an encrypted version of the MAC into a predefined portion of a ciphertext message; and generating, in response to the intermediate stream and the encrypted MAC, a remainder of the ciphertext message such that the remainder exhibits a predefined variation, e.g., a pseudo-random sequence, also contained within the encrypted MAC. Decryption proceeds in essentially a reverse fashion. By extending the sequence across the remainder of the ciphertext, any subsequent change to the ciphertext would likely destroy the continuity of the sequence otherwise residing throughout the remainder of the ciphertext. During decryption, any violation to the integrity of the ciphertext can be readily detected by decrypting the MAC contained in the ciphertext and comparing it, for any discrepancies, against a MAC generated from recovered plaintext.

66 Claims, 8 Drawing Sheets

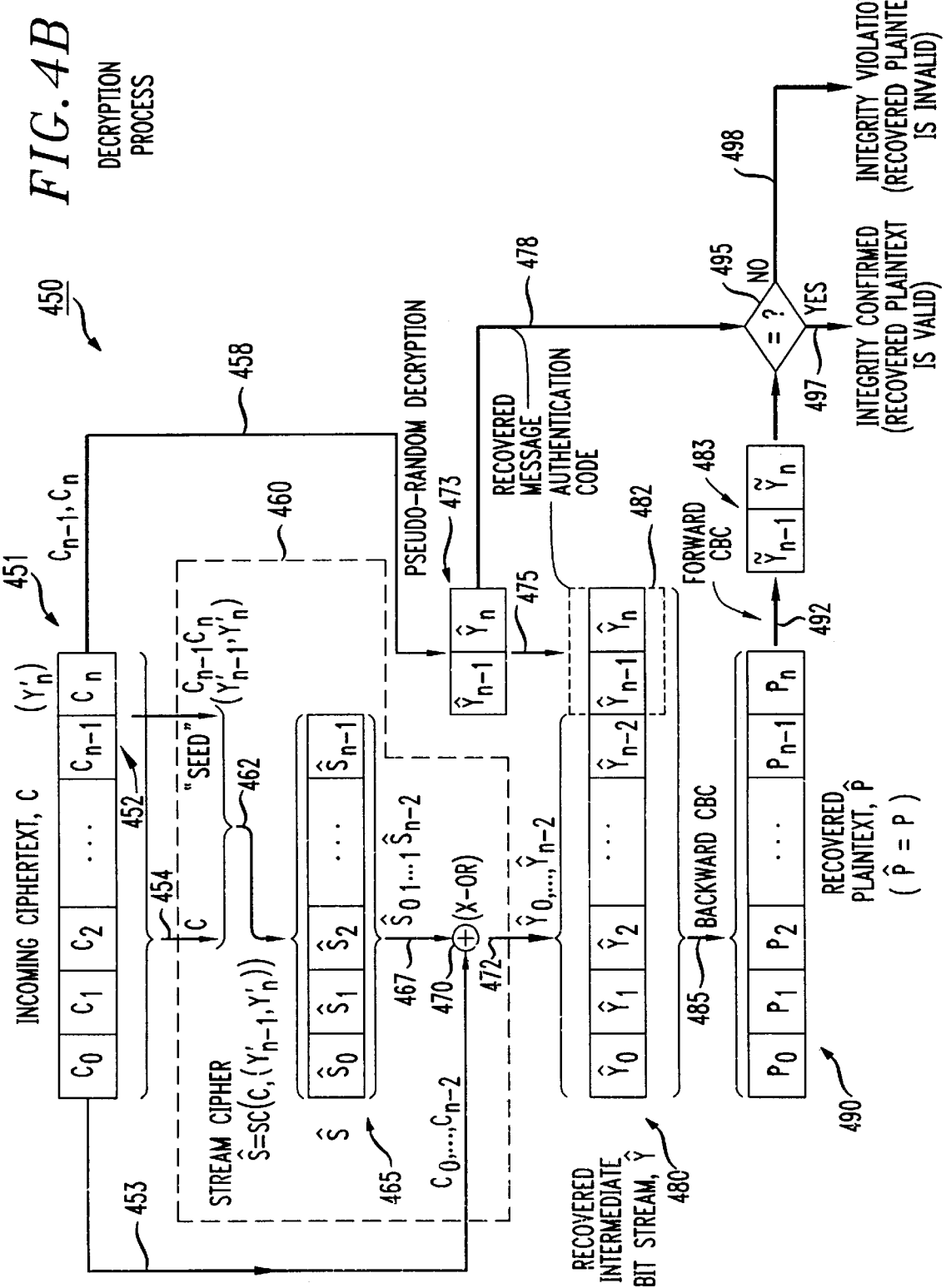

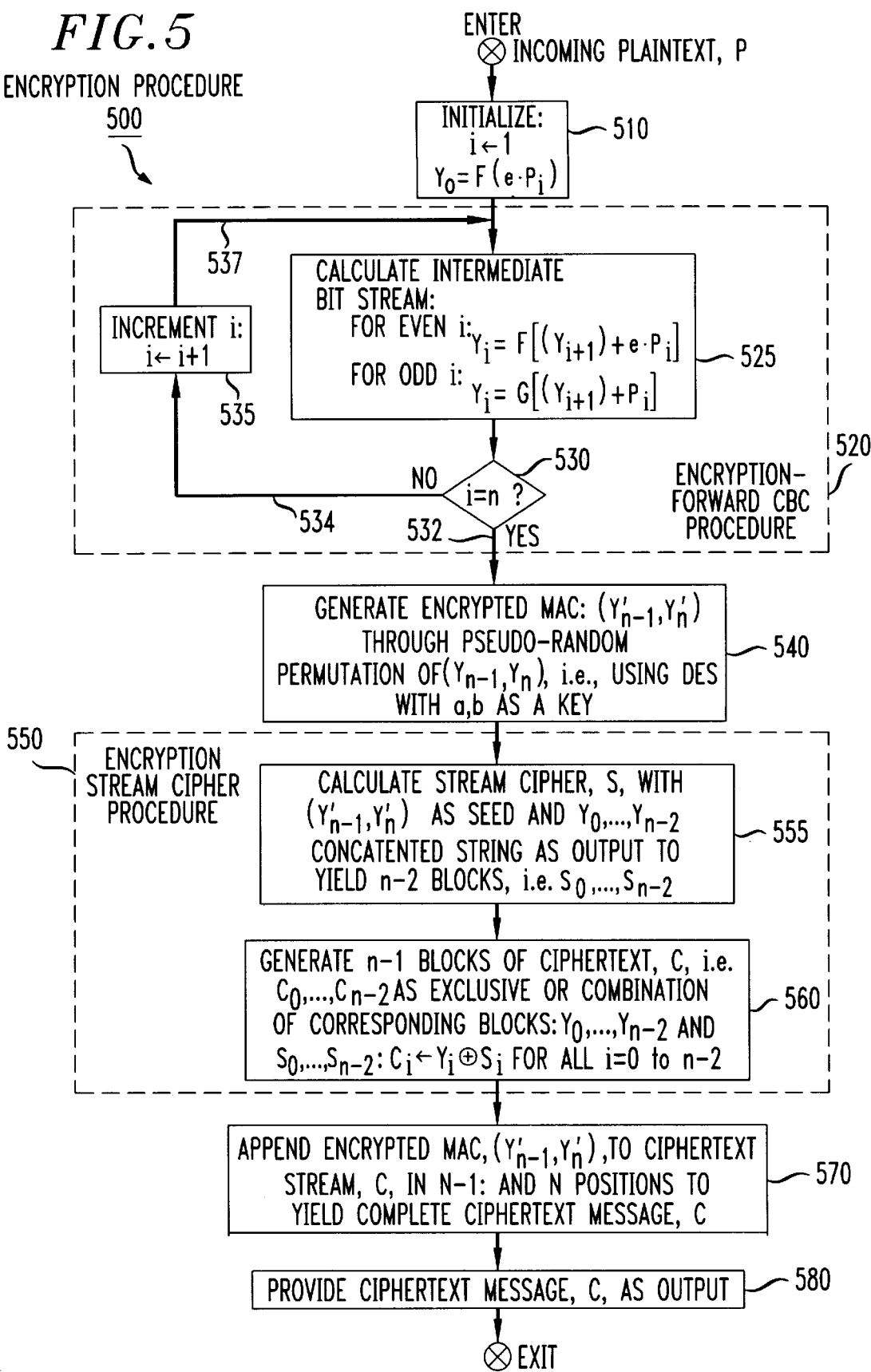

ENCRYPTION-BACKWARD CBC PROCEDURE 600

DECRYPTION-BACKWARD CBC PROCEDURE 800

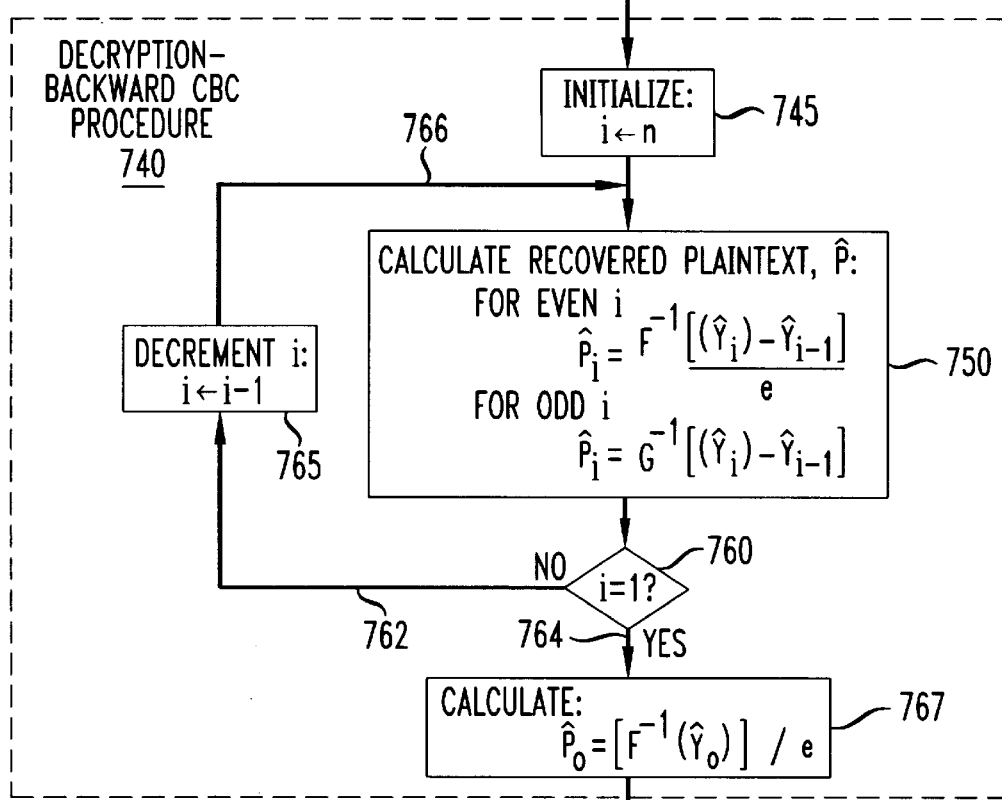
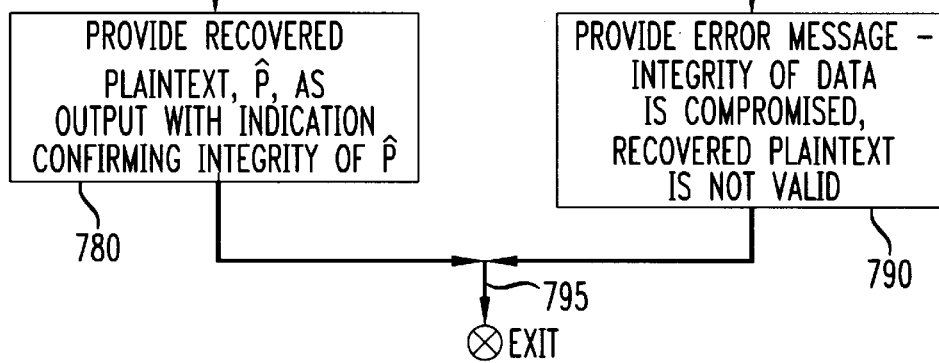

CRYPTOGRAPHIC TECHNIQUE THAT PROVIDES FAST ENCRYPTION AND DECRYPTION AND ASSURES INTEGRITY OF A CIPHERTEXT MESSAGE THROUGH USE OF A MESSAGE AUTHENTICATION CODE FORMED THROUGH CIPHER BLOCK CHAINING OF THE PLAINTEXT MESSAGE

BACKGROUND OF THE DISCLOSURE

1. Field of the Invention

The invention relates to cryptography, particularly a cryptographic technique that not only provides fast and extremely secure encryption and decryption but also assures integrity of a ciphertext message. Advantageously, this technique is particularly, though not exclusively, suited for use in real-time encryption and decryption of files, such as, but not limited to, those stored in a repository, e.g., a disk drive or other storage medium in a personal computer or server, or communicated through an insecure network. This technique can also be used to efficiently and rapidly generate a message authentication code (MAC).

2. Description of the Prior Art

Over the centuries, for as long as information has been communicated between two individuals, the information has been susceptible to third-party interception, eavesdropping, compromise and/or corruption. Clearly, the problem of securely protecting information from such acts has existed for quite a long time.

Traditionally, this problem has been handled through the development, over the years, of increasingly sophisticated cryptographic techniques. One class of these techniques involves the use of key-based ciphers. In particular, through a key-based cipher, sequences of intelligible data, i.e., plaintext, that collectively form a message are each mathematically transformed, through an enciphering algorithm, into seemingly unintelligible data, i.e., so-called ciphertext. Not only must the transformation be completely reversible, i.e., two way in the sense that the ciphertext must be invertable back to its corresponding original plaintext but also on a 1:1 basis, i.e., each element of plaintext can only be transformed into one and only one element of ciphertext. In addition, a particular cipher that generated any given ciphertext must be sufficiently secure from cryptanalysis. To provide a requisite level of security, a unique key is selected which defines only one unique corresponding cipher, i.e., precluding, to the extent possible, a situation where multiple differing keys each yields reversible transformations between the same plaintext-ciphertext correspondence. The strength of any cryptographic technique and hence the degree of protection it affords from third-party intrusion is directly proportional to the time required, by a third-party, to perform cryptanalysis, e.g., with a key-based cipher to successfully convert the ciphertext into its corresponding plaintext without prior knowledge of the key. While no encryption technique is completely impervious from cryptanalysis, an immense number of calculations and an extremely long time interval required therefor—given the computing technology then available to break a cipher without prior knowledge of its key effectively renders many techniques, for all practical intents and purposes, sufficiently secure to warrant their widespread adoption and use. In that regard, as recently as a few years ago, if a cipher was of such complexity that it required on the order of man-years or more to break, in view of the state of the processing technology then available to do so, the underlying cryptographic technique was viewed by many as rendering a sufficient decree of security to warrant its use.

However, computing technology continues to rapidly evolve. Processors, once unheard of just a few years ago in terms of their high levels of sophistication and speed, are becoming commercially available at ever decreasing prices. Consequently, processing systems, such as personal computers and workstations, that were previously viewed as not possessing sufficient processing power to break many so-called "secure" cryptographic ciphers are now, given their current power and sophistication, providing third parties with the necessary capability to effectively break those same ciphers. What may have taken years of continual computing a decade ago can now be accomplished in a very small fraction of that time. Hence, as technology evolves, the art of cryptography advances in lockstep in a continual effort to develop increasingly sophisticated cryptographic techniques that withstand correspondingly intensifying cryptanalysis.

Over the past few years, the Internet community has experienced explosive and exponential growth—growth that, by many accounts, will only continue increasing. Given the vast and increasing magnitude of this community, both in terms of the number of individual users and web sites and sharply reduced costs associated with electronically communicating information, such as e-mail messages and electronic files, over the Internet between one user and another as well as between any individual client computer and a web server, electronic communication, rather than more traditional postal mail, is rapidly becoming a medium of choice for communicating information, whether it be, e.g., an e-mail message or a program update file. In that regard, the cost of sending an electronic file between computers located on opposite sides of the Earth is a very small fraction of the cost associated with storing that file on a diskette (or other media) and transporting that media between these locations even through the least expensive class of postal mail service. However, the Internet, being a publicly accessible network, is not secure and, in fact, has been and increasingly continues to be a target of a wide variety of attacks from various individuals and organizations intent on eavesdropping, intercepting and/or otherwise compromising or even corrupting message traffic flowing on the Internet or illicitly penetrating sites connected to the Internet. This security threat, in view of the increasing reliance placed on use of the Internet as a preferred medium of communication, exacerbates the efforts in the art, otherwise fostered by primarily continuing advances in computing power, to develop increasingly strong cryptographic techniques that provide enhanced levels of security to electronic communication.

However, encryption, by itself, provides no guarantee that an enciphered message can not be or has not been compromised during transmission or storage by a third party. Encryption does not assure integrity. An encrypted message could be intercepted and changed, even though it may be, in any instance, practically impossible, to cryptanalyze. In that regard, the third party could intercept, or otherwise improperly access, a ciphertext message, then substitute a predefined illicit ciphertext block(s) which that party, or someone else acting in concert with that party, has specifically devised for a corresponding block(s) in the message; and thereafter, transmit that resulting message with the substituted ciphertext block(s) onward to a destination—all without the knowledge of the eventual recipient of the message and to the eventual detriment of the original message sender and/or its recipient. For example, if the message involved a financial transaction between a purchaser and a seller, the substituted block could be an enciphered account number of the third party rather than that of the intended seller; hence, with an eventual effect of possibly illicitly diverting money originally destined to the seller to the third party instead. For a variety of reasons, messages carried over the Internet are vulnerable in this regard.

Detecting altered communication is not confined to Internet messages. With the burgeoning use of stand-alone personal computers, very often, an individual or business will store confidential or other information within the computer, such as on a hard-disk therein, with a desire to safeguard that information from illicit access and alteration by third-parties. Password controlled access—which is commonly used to restrict access to a given computer and/or a specific file stored thereon—provides a certain, but rather rudimentary, form of file protection. Often users are cavalier about their passwords, either in terms of safeguarding their password from others or simply picking passwords that others can easily discern; thereby creating a security risk. Once password protection is circumvented—by whatever means are used, a third party can access a stored file and then change it, with the owner of the file then being completely oblivious to any such change.

Therefore, a need exists in the art for a cryptographic technique that not only provides an extremely high level of security against cryptanalysis, particularly given the sophistication and power of current and future processing technology, but also is capable of detecting a change made to a ciphertext message. Such a technique would find wide application, including, but not limited to use, in, e.g., secure file storage or safeguarding messages transmitted over an insecure network.

SUMMARY OF THE INVENTION

Advantageously, our inventive cryptographic technique satisfies this need and overcomes the deficiencies in the art by, in accordance with our broad inventive teachings, during message encryption: generating, in response to an incoming plaintext message, an intermediate stream, wherein a pre-defined portion of the intermediate stream defines a message authentication code (MAC); inserting an encrypted version of the MAC into a predefined portion of a ciphertext message; and generating, in response to the intermediate stream and the encrypted MAC, a remainder of the ciphertext message such that the remainder exhibits a predefined variation, e.g., a pseudo-random sequence, also contained within the encrypted MAC. Decryption proceeds in essentially a reverse fashion to that of encryption. By virtue of extending a specific pseudo-random sequence, as defined by the encrypted MAC, across the remainder of the ciphertext, any subsequent change to the ciphertext would, in all likelihood, destroy the continuity of the pseudo-random sequence that would otherwise reside throughout the remainder of the ciphertext. Hence, during decryption, any preceding violation to the integrity of the ciphertext, i.e., changes made thereto, can be readily detected by decrypting the MAC contained in the ciphertext, eliminating the pseudo-random sequence from the ciphertext to yield an intermediate stream, recovering the plaintext from this intermediate stream, recreating (recovering) a MAC from the recovered plaintext and then comparing the recreated and decrypted MACs for any discrepancy therebetween. Any such discrepancy would signify that the ciphertext has been changed and so indicate that the recovered plaintext is invalid.

Specifically, each block of a plaintext message, P, is first transformed, through, e.g., chaining using a forward cipher block chain (CBC), to yield a corresponding block in an intermediate bit stream, Y, that is a function not only of that plaintext block but also of all the other preceding blocks in the plaintext message. Illustratively, two blocks in the intermediate bit stream, i.e., $Y_{n-1}$ and $Y_n$, are concatenated together to form a 64-bit MAC $(Y_{n-1}, Y_n)$. The MAC is separately encrypted using conventional pseudo-random encryption, such as DES (data encryption standard), to yield a 64-bit encrypted MAC $(Y_{n-1}', Y_n')$. The remaining blocks, i.e., n−2 blocks, in the intermediate bit stream, i.e., $Y_0, \ldots, Y_{n-2}$, are themselves chained together, in conjunction with the encrypted MAC as a "seed", to yield the lowest order n−2 ciphertext blocks in a ciphertext message, C. Through this chaining, the pseudo-random sequence inherent in the encrypted MAC is advantageously extended throughout the remainder of the ciphertext message. The encrypted MAC is then inserted into the ciphertext message as blocks n−1 and n. Decryption proceeds in a reverse fashion.

Furthermore, as noted, if the ciphertext message were to be tampered in some fashion—such as, e.g., through substitution of an illicit ciphertext block for an original ciphertext block, then the pseudo-random sequence, inherent in the encrypted MAC, would no longer extend throughout the remainder of the ciphertext. Consequently, the continuity of that particular sequence throughout all n−2 blocks in the ciphertext would be destroyed; in effect a different such sequence would arise. In that regard, the recovered MAC is affected, inversely, by whatever pseudo-random sequence (if any) then existed in the ciphertext when it is ultimately decrypted. In contrast, the MAC, that has been decrypted directly from the ciphertext, has determined the original pseudo-random sequence that was originally extended throughout the remainder of the ciphertext upon its creation. The slightest change in the ciphertext would cause a mismatch between these two MACs; thereby indicating that the ciphertext has been tampered.

In particular, once the MAC has been decrypted, from the ciphertext message by, e.g., an inverse DES process, that MAC value is temporarily stored. After the plaintext message has been recovered, that particular plaintext message is then processed through a backward CBC to generate a recovered MAC, $(\tilde{Y}_{n-1}, \tilde{Y}_n)$. The recovered MAC is then compared to the decrypted MAC. If the two identically match, then the ciphertext has not been altered; hence, the recovered plaintext generated therefrom is valid. However, if any discrepancy arises between the recovered and the decrypted MACs, then the contents of the ciphertext message have been modified; hence, the recovered plaintext obtained therefrom is invalid and should be ignored.

As a feature of our specific inventive teachings, the pseudo-random bit sequence inherent in the encrypted MAC can be extended throughout the remaining n−2 blocks of the ciphertext message through various alternate techniques, such as, e.g., a stream cipher or a backward CBC.

BRIEF DESCRIPTION OF THE DRAWINGS

The teachings of the present invention can be readily understood by considering the following detailed description in conjunction with the accompanying drawings, in which:

FIG. 4B depicts a simplified high-level view of our inventive decryption process;

FIG. 5 depicts a flowchart of Encryption procedure 500 that forms part of application programs 130 and is executed within, illustratively, client computer 100 shown in FIG. 2;

FIG. 7 depicts the correct alignment of the drawing sheets for FIGS. 7A and 7B;

FIGS. 7A and 7B collectively depict a flowchart of Decryption procedure 700 that forms part of application programs 130 and is executed within, illustratively, client computer 100 shown in FIG. 2.

To facilitate understanding, identical reference numerals have been used, where possible, to designate identical elements that are common to the figures.

DETAILED DESCRIPTION

After considering the following description, those skilled in the art will clearly realize that the teachings of our present invention can be utilized in any one of an extremely wide range of applications where secure encryption of information is desired. Moreover, not only will use of our invention provide secure encryption but also it will permit a recipient of information to determine whether the integrity of the encrypted information has been violated from the time that information was encrypted to the time it reaches the recipient, at which the information will be subsequently decrypted and used. Information, in this instance and as the term will be used hereinafter, is defined as generically encompassing all information that can be stored digitally, regardless of its specific content, i.e., whether that information is executable program code or data of one form or another. For purposes of simplification, we will discuss our invention in the context of use in an client-server transaction processing environment where transaction messages are to be communicated over an insecure network, such as the Internet.

A. Overview

Figure 1:
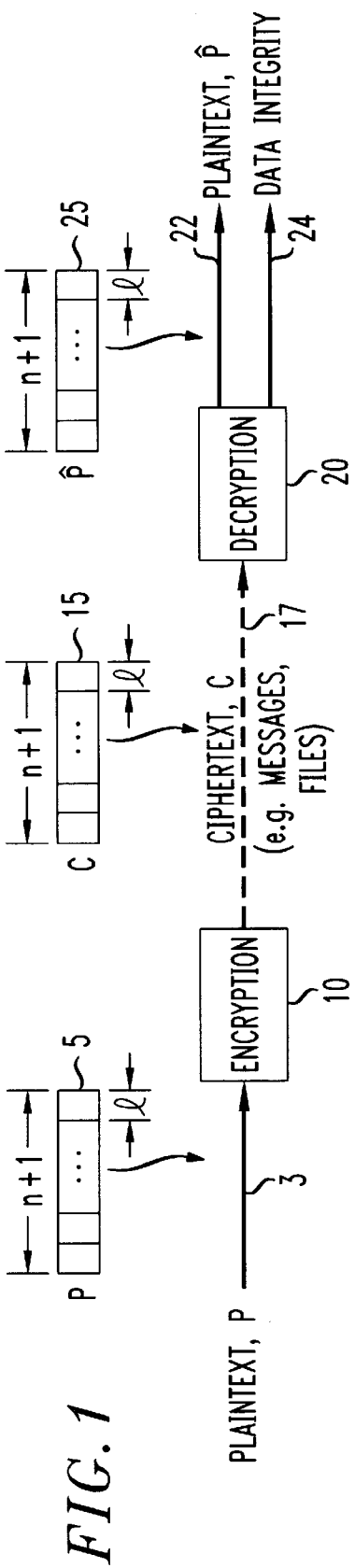
FIG. 1 depicts a diagram of an overall cryptographic process that incorporates the teachings of the present invention.

FIG. 1 depicts a diagram of an overall cryptographic process that incorporates the teachings of the present invention. As shown, incoming plaintext information 5, is organized into so-called "messages". Each such message, designated as P, appearing on input line 3 is organized as n+1 blocks, with each block being l bits in width, which here l is illustratively 32 bits. Each such plaintext block is encrypted, through our inventive cryptographic process as will be described in detail below in conjunction with FIGS. 4A, 5 and 6, into a corresponding block of ciphertext data 15. A ciphertext message, designated as C, is formed of n+1 successive 32-bit blocks of ciphertext. Resulting ciphertext message C is then stored or transferred, through a given modality, e.g., a network communication channel, represented by dashed line 17, to a recipient location. Here, the ciphertext message is decrypted to yield recovered plaintext message 25 also denoted as plaintext message $\hat{P}$, which is identical in all aspects to original plaintext message P. In addition, our inventive decryption process, which will be discussed in detail below in conjunction with FIGS. 4B, 7A, 7B and 8, not only generates the recovered plaintext message, on line 22, but also provides an indication, on line 24, as to whether the integrity of ciphertext message C was violated, at some point during its carriage through channel 17; hence, invalidating the recovered plaintext message. This indication, in turn, is supplied to, e.g., a downstream processor (not specifically shown) to suitably instruct, e.g., an application program executing thereat, to ignore the recovered plaintext message.

B. Illustrative Processing Environment

Figure 2:
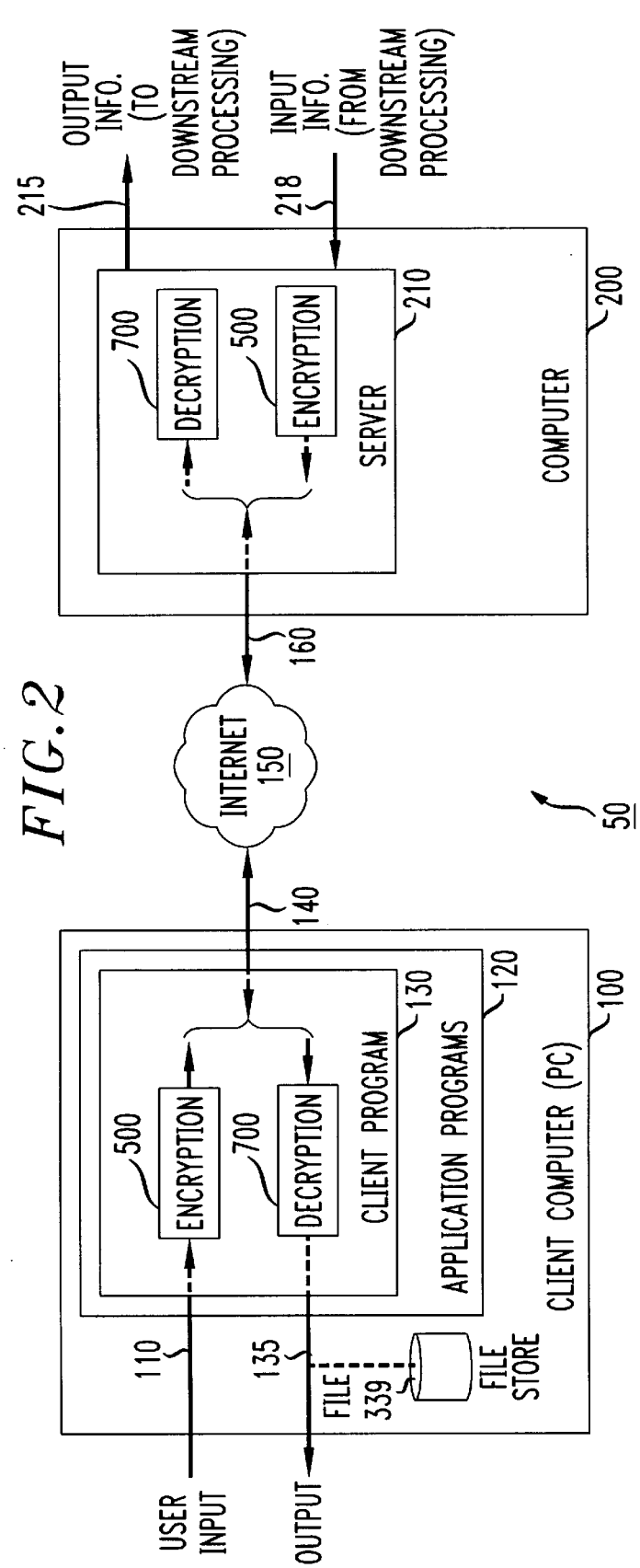
FIG. 2 depicts a high-level block diagram of a typical Internet-based client-server processing environment that illustratively utilizes the present invention.

With the above in mind, consider FIG. 2 which depicts a high-level block diagram of client-server processing environment 50 that utilizes the present invention.

As shown, this environment contains computer 200 which implements server 210, the latter illustratively being a web server. A number of individual remotely-located client computers, each being illustratively a personal computer (PC), of which only one such client, i.e., client computer 100, is specifically shown, is connected using appropriate communications channels, such as channels 140 and 160, through an insecure communications network, here shown as illustratively Internet 150, to computer 200. A user (not specifically shown), stationed at client computer 100 and desirous of obtaining information from the server can invoke a corresponding client program at that computer. Client program 130 forms one of a number of application programs 120 that collectively reside within and are executed by client computer 100. Though the client program is specifically shown as residing within the application programs, the former can also be implemented as a component, such as a web browser, of an operating system (O/S), for example, of O/S 337 shown in FIG. 3. Server 210, shown in FIG. 2, can implement any of a wide variety of application functions including, for example, a commerce server, a banking server, an electronic mail or a file server. As to electronic commerce, the user might desire to conduct a commercial transaction through server 210 that involves providing (as symbolized by line 110) information to the server, such as an account number of the user at a financial institution and payment instructions to transfer funds to a payee, or obtaining (as symbolized by line 135) information from the server, such as available account or credit balances of the user, which, in either event, is confidential to that user. Alternatively, server 210 may be a file server that provides the user with access to various files stored in a repository, any of which the user can download. Once such a file is downloaded, it can be stored within, e.g., local file store 339, situated within client computer 100 for local use thereat. However, any such file may contain proprietary and/or confidential information for which its owner desires to control user access. For example, such a file can be a self-installing executable file of an update for a given a program, for which its owner, e.g., a software manufacturer, desires to prevent illicit public access, i.e., preventing the update from being used by any individual who has not remitted appropriate payment for it. Server 210 itself may also provide confidential or proprietary information (as symbolized by line 215) from the user, via network 150, to downstream equipment (not specifically shown) for subsequent processing, or receive (as symbolized by line 218) confidential or proprietary information from downstream equipment for eventual transmission, via the network, to the user.

Network 150, being illustratively the Internet, is susceptible to being compromised by a third-party. In that regard, the third party could intercept a conventionally enciphered message then being carried over the network and emanating from, e.g., client computer 100, for, e.g., an on-going financial transaction involving a user situated thereat. While the third party may not have sufficient resources either in terms of available processing capacity or time to break the conventional cipher used for encrypting messages and recover the plaintext inherent in the transmitted message, that party may nevertheless possess sufficient knowledge of the ciphertext message, specifically its structural organization, and equipment needed to successfully change that message to the detriment of the user. In that regard, the third party might illicitly tamper with the ciphertext message by substituting one or more predefined ciphertext blocks for corresponding original ciphertext blocks, and then transmit a resulting modified ciphertext message back onto the network for carriage to computer 200 for processing thereat. The contents of these predefined blocks might be carefully constructed by another individual who has requisite knowledge of the messaging itself, particularly its contents, utilized by server 210 and including the enciphering algorithm used thereby. That individual could construct appropriate plaintext blocks and then encipher these blocks using the enciphering algorithm to generate the predefined ciphertext blocks which, in turn, might then be supplied to the third-party for actual and subsequent substitution into the intercepted ciphertext message. The predefined blocks might intentionally change the nature of the transaction to generate illicit gain (or other mischief), such as by substituting a block containing a bank routing number and an account number of a payee with a block containing a different bank routing number and/or different account number; hence, ultimately causing funds to be electronically diverted from the payee to another party.

To safeguard the confidential or proprietary nature of the information, transiting over network 150 between client computer 100 and computer 200, from third-party access, both the client program 130 and server 210 each utilizes cryptographic communication through incorporation of inventive encryption procedure 500 and inventive decryption procedure 700 therein. As such, messages destined for network carriage and generated by one network application peer, either client program 130 or server 210, are each encrypted by encryption procedure 500 therein to yield corresponding ciphertext messages, which, in turn, are then each transmitted over network 150 to the other network application peer. Similarly, ciphertext messages received, from the network, by each of the peers is decrypted by decryption procedure 700 therein to yield an appropriate recovered plaintext message. Encryption and decryption procedures 500 and 700 are inverse procedures of each other.

Furthermore, through use of our inventive encryption and decryption processes in each network application peer, that peer can not only provide secure communication with its other peer but can also detect whether any ciphertext message destined to it from the latter peer has been tampered, and if so, ignore that message. By doing so, our inventive technique advantageously effectively precludes a third-party from benefiting by tampering with transmitted ciphertext.

C. Client Computer 100

Figure 3:
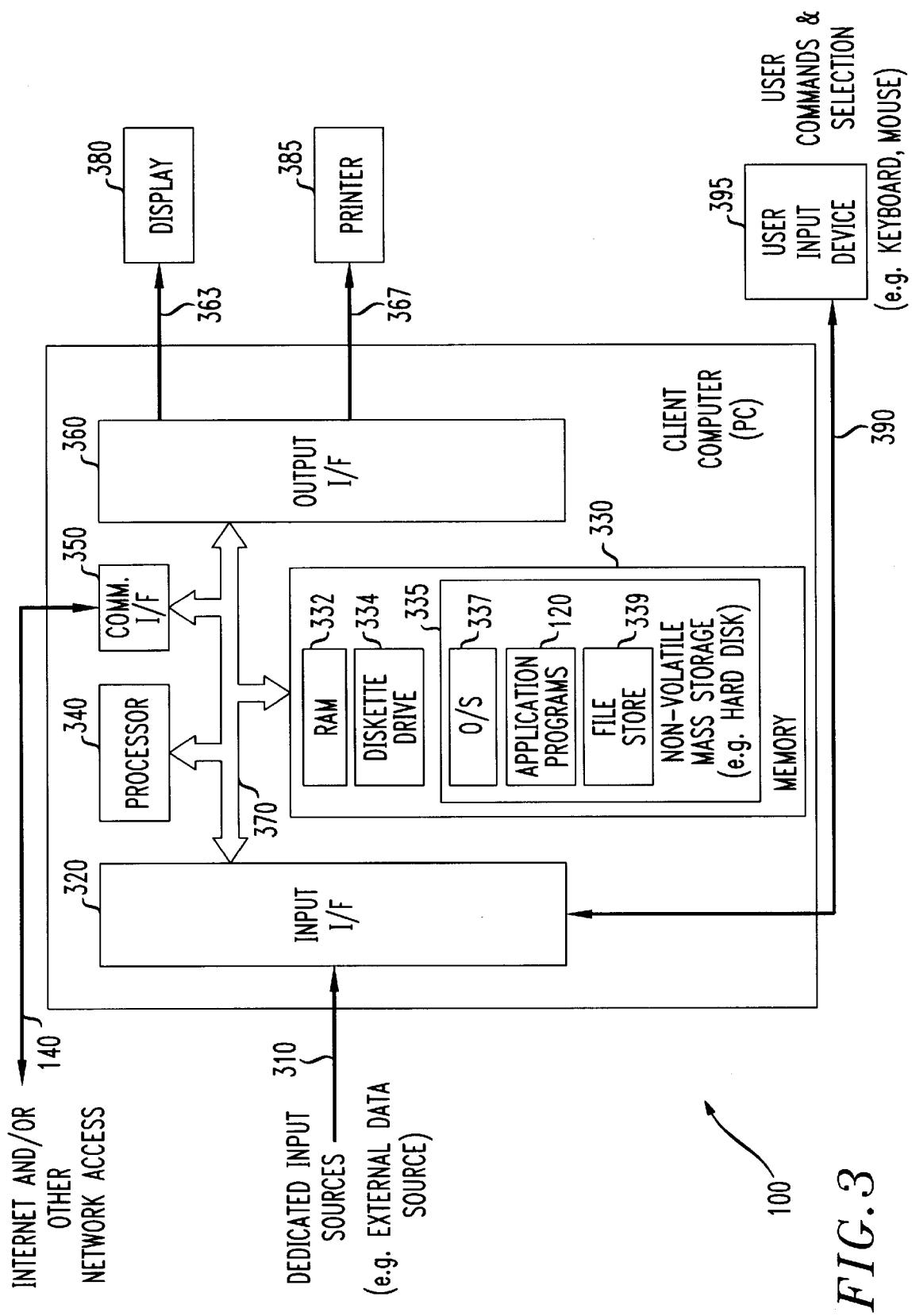
FIG. 3 depicts a block diagram of client computer 100 shown in FIG. 2.

FIG. 3 depicts a block diagram of client computer (PC) 100.

As shown, client computer 100 comprises input interfaces (I/F) 320, processor 340, communications interface 350, memory 330 and output interfaces 360, all conventionally interconnected by bus 370. Memory 330, which generally includes different modalities, including illustratively random access memory (RAM) 332 for temporary data and instruction store, diskette drive(s) 334 for exchanging information, as per user command, with floppy diskettes, and non-volatile mass store 335 that is implemented through a hard disk, typically magnetic in nature. Mass store 335 may also contain a CD-ROM or other optical media reader (not specifically shown) (or writer) to read information from (and write information onto) suitable optical storage media. The mass store implements file store (repository) 339. In addition, mass store 335 also stores operating system (O/S) 337 and application programs 120; the latter illustratively containing client program 130 (see FIG. 2) which incorporates our inventive cryptographic technique. O/S 337, shown in FIG. 3, may be implemented by any conventional operating system, such as the WINDOWS NT operating system ("Windows NT" is a registered trademark of Microsoft Corporation of Redmond, Wash.). Given that, we will not discuss any components of O/S 337 as they are all irrelevant. Suffice it to say, that the client program, being one of application programs 120, executes under control of the O/S.

Advantageously, our present inventive cryptographic technique, when embedded for use within a client program requires no user interaction—other than to establish an appropriate key (as discussed below) and thus, in use, can be substantially, if not totally, transparent to the user.

As shown in FIG. 3, incoming information can arise from two illustrative external sources: network supplied information, e.g., from the Internet and/or other networked facility, through network connection 140 to communications interface 350, or from a dedicated input source, via path(es) 310, to input interfaces 320. Dedicated input can originate from a wide variety of sources, e.g., an external database. In addition, input information, in the form of files or specific content therein, can also be provided by inserting a diskette containing the information into diskette drive 334 from which computer 100, under user instruction, will access and read that information from the diskette. Input interfaces 320 contain appropriate circuitry to provide necessary and corresponding electrical connections required to physically connect and interface each differing dedicated source of input information to computer system 100. Under control of the operating system, application programs 120 exchange commands and data with the external sources, via network connection 140 or path(es) 310, to transmit and receive information typically requested by a user during program execution.

Input interfaces 320 also electrically connect and interface user input device 395, such as a keyboard and mouse, to computer system 100. Display 380, such as a conventional color monitor, and printer 385, such as a conventional laser printer, are connected, via leads 363 and 367, respectively, to output interfaces 360. The output interfaces provide requisite circuitry to electrically connect and interface the display and printer to the computer system. As one can appreciate, our present inventive cryptographic technique can operate with any type of digital information regardless of the modalities through which client computer 100 will obtain that information, store and/or communicate that information.

Furthermore, since the specific hardware components of computer system 100 as well as all aspects of the software stored within memory 335, apart from the modules that implement the present invention, are conventional and well-known, they will not be discussed in any further detail.

Generally speaking, computer 200 has an architecture that is quite similar to that of client computer 100.

D. Inventive Cryptographic Technique

Through our present invention, a plaintext message can be securely encrypted and any violations of the integrity of a resulting ciphertext message readily detected by, during encryption: generating, in response to an incoming plaintext message, an intermediate stream, wherein a predefined portion of the intermediate stream defines a message authentication code (MAC); inserting an encrypted version of the MAC into a predefined portion of a ciphertext message; and generating, in response to the intermediate stream and the encrypted MAC, a remainder of the ciphertext message such that the remainder exhibits a predefined variation, e.g., a pseudo-random variation, also contained within the encrypted MAC. Decryption proceeds in essentially a reverse fashion to that of encryption. By virtue of extending a specific pseudo-random sequence, as defined by the encrypted MAC, across the remainder of the ciphertext, any subsequent change to the ciphertext would, in all likelihood, destroy the continuity of the pseudo-random sequence that would otherwise reside throughout the remainder of the ciphertext. Hence, during decryption any preceding violation to the integrity of the ciphertext can be readily detected by decrypting the MAC contained in the ciphertext, eliminating the pseudo-random variation from the ciphertext to yield an intermediate stream, recovering the plaintext from this intermediate stream, recreating (recovering) a MAC from the recovered plaintext and then comparing the recreated and decrypted MACs for any discrepancy therebetween. Any such discrepancy would signify that the ciphertext has been changed and so indicate that the recovered plaintext is invalid.

Specifically, each block of a plaintext message, P, is first transformed, through, e.g., chaining using a forward cipher block chain (CBC), to yield a corresponding block in an intermediate bit stream, Y, that is a function not only of that plaintext block but also of all the other preceding blocks in the plaintext message. Illustratively, two blocks in the intermediate bit stream, i.e., $Y_{n-1}$ and $Y_n$, are concatenated together to form a 64-bit MAC ($Y_{n-1}$, $Y_n$) (a comma separating successive values in parentheses is used hereinafter as an operator to denote concatenation of those values). By chaining a plaintext message and defining the MAC as a predefined portion, e.g., ($Y_{n-1}$, $Y_n$), of the ensuing chained message, the MAC can be generated rather quickly and efficiently. The MAC is separately encrypted using conventional pseudo-random encryption, such as DES (data encryption standard), to yield a 64-bit encrypted MAC ($Y_{n-1}'$, $Y_n'$). The remaining blocks, i.e., n−2 blocks, in the intermediate bit stream, i.e., $Y_0, \ldots, Y_{n-2}$, are themselves chained together, in conjunction with the encrypted MAC, to yield the lowest order n−2 ciphertext blocks in a ciphertext message, C. Through this chaining, the pseudo-random sequence inherent in the encrypted MAC is advantageously extended throughout the remainder of the ciphertext message. The encrypted MAC is then inserted into the ciphertext message as blocks n−1 and n. Decryption proceeds in a reverse fashion.

Furthermore, as noted, if the ciphertext message were to be tampered in some fashion—such as, e.g., through substitution of an illicit ciphertext block for an original ciphertext block, then the pseudo-random sequence, inherent in the encrypted MAC, would no longer extend throughout the remainder of the ciphertext. Consequently, the continuity of that particular sequence throughout all n−2 blocks in the ciphertext would be destroyed; in effect a different such sequence would arise. In that regard, the recovered MAC is affected, inversely, by whatever pseudo-random sequence (if any) then existed in the ciphertext when it is ultimately decrypted. In contrast, the MAC that has been decrypted directly from the ciphertext has determined the original pseudo-random sequence that was originally extended throughout the remainder of the ciphertext upon its creation. The slightest change in the ciphertext would cause a mismatch between these two MACs; thereby indicating that the ciphertext has been tampered.

In particular, once the MAC has been decrypted, from the ciphertext message by, e.g., an inverse DES process, that MAC value is temporarily stored. After the plaintext message has been recovered, that particular plaintext message is then processed through a backward CBC to generate a recreated (recovered) MAC, ($\tilde{Y}_{n-1}$, $\tilde{Y}_n$) The recovered MAC is then compared to the decrypted MAC. If the two identically match, then the ciphertext has not been altered; hence, the recovered plaintext generated therefrom is valid. However, if any discrepancy arises between the recovered and the decrypted MACs, then the contents of the ciphertext message have been modified; hence, the recovered plaintext obtained therefrom is invalid and should be ignored.

In accordance with our specific inventive teachings, the pseudo-random bit sequence inherent in the encrypted MAC can be extended throughout the remaining n−2 blocks of the ciphertext message through various alternate techniques. In particular, through one illustrative technique, these n−2 ciphertext blocks can be generated by first processing the lowest order n−2 bits of the intermediate bit stream, $Y_0, \ldots, Y_{n-2}$, through a conventional stream cipher, using the encrypted MAC as a seed. The contents of each of the resulting n−2 ciphertext blocks are then combined, preferably by exclusive-OR, with a corresponding block of the intermediate bit stream, to yield a corresponding one of the n−2 blocks of the ciphertext message. Alternatively, these n−2 ciphertext blocks can be generated by processing the lowest order n−2 bits of the intermediate bit stream through a backward CBC.

With the above in mind and to facilitate reader understanding, we will discuss our inventive cryptographic technique, first in context of the cryptographic key and underlying mathematical functions, then a high-level overview of the encryption and decryption processes, and finally in the context of software modules, specifically Encryption procedure 500 and Decryption procedure 700 (see, e.g., FIG. 2), that collectively implement these processes.

First, we assume that all mathematical operations performed by our inventive technique occur in a field of integers Z(mod p), i.e., 0, 1, . . . , p−1, where p is a substantially large prime number. We define a key, within this field, as a concatenation of five integers, i.e., (a, b, c, d, e). In order to use our inventive cryptographic technique, the key will need to be supplied to both the encryption and decryption procedures. Inasmuch as our technique relies on employing a single common key for encryption and decryption, then, if our technique is being used to encrypt messages for network transport, then the key will need to be communicated between the communicating peers in a secure fashion. Any one of a wide variety of schemes, such as, e.g., public key cryptography, can be used to so communicate the key. Inasmuch as the manner through which the key is so communicated is irrelevant to our invention, we will not address it in any further detail.

We also define two illustratively linear functions using portions of the key, illustratively as given by equations (1) and (2) below:

$$F(x)=ax+b \qquad (1)$$

and $$G(x)=cx+d \qquad (2)$$

which, as will be seen below, will be used in conjunction with the CBCs. We have determined that our inventive cryptographic technique is secure with use of such linear functions. Hence, while our technique could be implemented with higher-order functions, e.g., quadratic functions, for ease of implementation and significantly reduced processing time, linear CBCs are preferred. In addition, the length of a message is n+1 blocks where n=2m+1, where n and m are both integers within the field Z(mod p); with each such block containing 32 bits. The DES key, for MAC encryption and decryption, is illustratively defined as (a, b).

Figure 4A:
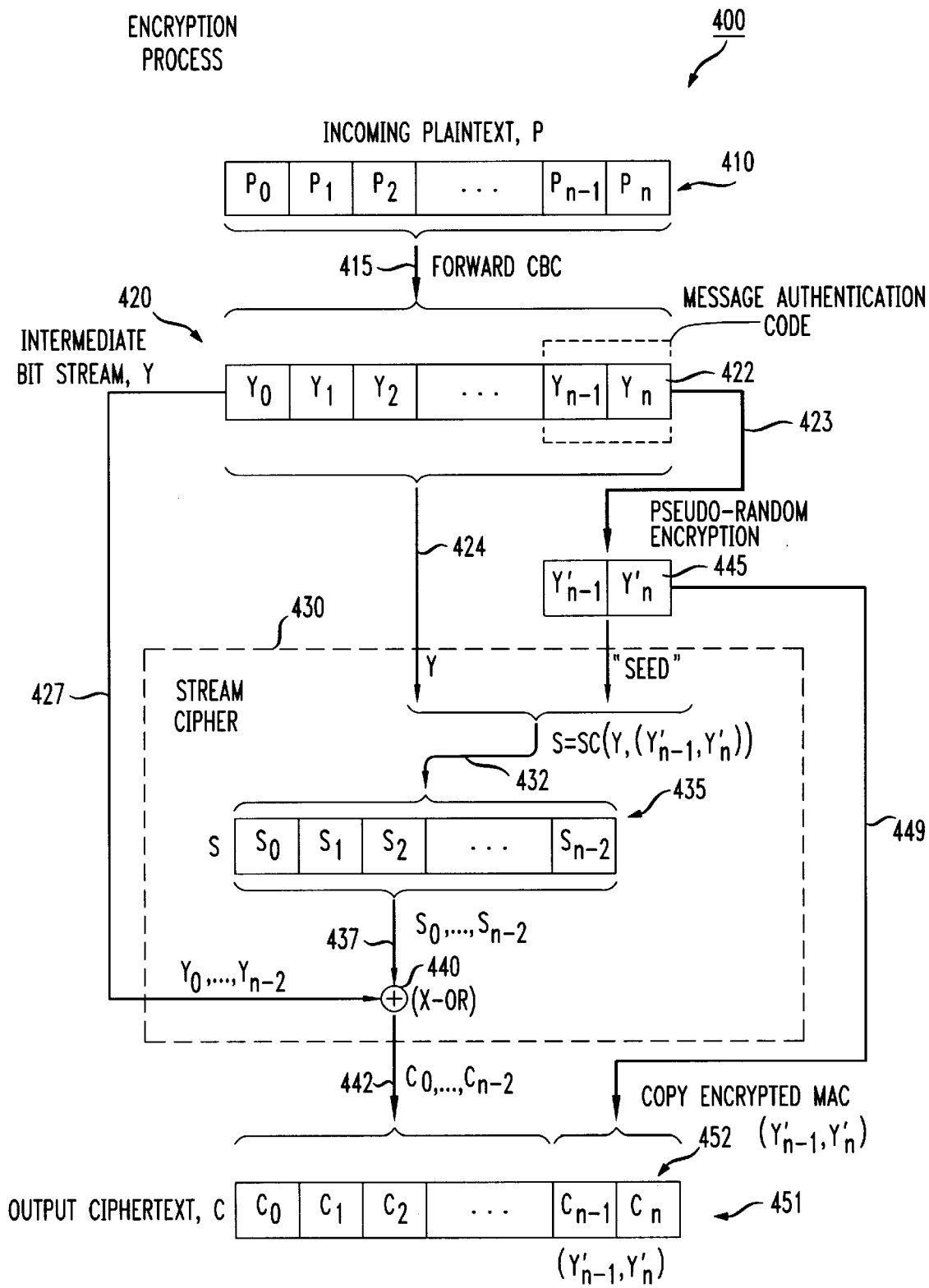
FIG. 4A depicts a simplified high-level view of our inventive encryption process.

FIG. 4A depicts a simplified high-level view of our inventive encryption process 400.

First, an incoming plaintext message, P having blocks $P_0, \ldots, P_n$ and denoted as message 410, is processed, as symbolized by line 415, through a forward CBC, to yield intermediate message Y, also denoted as message 420, formed of individual blocks $Y_0, \ldots, Y_n$. The forward CBC is implemented through the following functions:

For i=0:

$$Y_0=F[e \cdot P_0] \qquad (3)$$

For even i within n:

$$Y_i=F[(Y_{i-1})+e \cdot P_i] \qquad (4)$$

For odd i within n:

$$Y_i=G[(Y_{i-1})+P_i] \qquad (5)$$

Once the intermediate bit stream is fully computed, illustratively the concatenated contents of the two highest order blocks, $(Y_{n-1}, Y_n)$, collectively form MAC 22. These two blocks are then encrypted, as symbolized by line 423, illustratively using a conventional pseudo-random encryption algorithm, such as but not limited to DES, using (a, b) as the key, to yield encrypted MAC 445. This encryption algorithm is not limited to DES, but can in fact be any algorithm that yields a pseudo-random permutation. The resulting encrypted MAC $(Y_{n-1}', Y_n')$ is then applied as a seed to a conventional stream cipher algorithm, such as illustratively the RC4 algorithm. The stream cipher, SC, symbolized by line 432, produces n−2 ciphered blocks, $S_0, \ldots, S_{n-2}$. The stream cipher extends a pseudo-random sequence in the two-block string of the encrypted MAC throughout the remaining n−2 blocks in the intermediate bit stream thereby yielding the ciphered stream, S also denoted as stream 435. For detailed information on stream ciphers, the reader is directed to: B. Schneier, *Applied Cryptography*, Second Edition, pages 197–198 (© 1996, J. W. Wiley & Sons, Inc.); and Chapter 2 "Stream Ciphers", pages 65–134 of G. J. Simmons (ed.) *Contemporary Cryptology—The Science of Information Integrity* (© 1992, IEEE Press); both of which are incorporated by reference herein. This n−2 block ciphered stream, appearing on line 437, is then combined, through exclusive-OR operation 440, on a corresponding block-by-block basis with the lowest order n−2 blocks in intermediate stream Y, appearing on line 427, to yield n−2 lowest order ciphertext blocks, $C_0, \ldots, C_{n-2}$. The two concatenated blocks that form the encrypted MAC are then copied, as symbolized by line 449, into two highest order blocks 452 in the ciphertext message, i.e., $C_{n-1}$ and $C_n$, to form, as output, a complete n+1 block ciphertext message, C also denoted as message 451. Though operation 440 is illustratively shown and described as being an exclusive-OR operation, generally speaking, this operation (as well as operation 470 shown in FIG. 4B) can be any conventional predetermined function that constitutes a "field operation".

As noted above and discussed in detail below, stream cipher procedure 430, which includes both the stream cipher and the exclusive-OR operations, can be replaced by a backward CBC. The backward CBC, as with the stream cipher, would extend the pseudo-random sequence in the encrypted MAC, which appears in the highest-order two blocks of the ciphertext message, across the remaining n−2 blocks in this message. The backward CBC would be implemented through equations (6)–(8) as follows:

For i=n−1:

$$C_{n-1}=F[e \cdot Y_{n-1}] \qquad (6)$$

For even i within 0≧i>n−1:

$$C_i=F[(C_{i+1})+e \cdot Y_i] \qquad (7)$$

For odd i within 0≦i>n−1:

$$C_i=G[(C_{i+1})+Y_i] \qquad (8)$$

FIG. 4B depicts a simplified high-level view of our inventive decryption process 450.

Given incoming ciphertext message C, having blocks $C_0, \ldots, C_n$ and specifically message 451, first the contents of two highest-order blocks that form encryted MAC 452 are extracted from the ciphertext message. These blocks are decrypted, as symbolized by line 458, by an inverse of the pseudo-random permutation algorithm used for encryption, e.g., inverse DES, with (a, b) as the key. The resulting decrypted MAC, $(\hat{Y}_{n-1}, \hat{Y}_n)$ and denoted as 473, is then stored for subsequent use. The entire ciphertext stream is applied, as symbolized by line 454, to stream cipher procedure 460 with the encrypted MAC being the seed. Within this procedure, the ciphertext stream is processed through a stream cipher, being the same as that used in stream cipher procedure 430 (see FIG. 4A) for encryption, to yield n−2 stream ciphered blocks $\hat{S}$, specifically blocks $\hat{S}_0, \ldots, \hat{S}_{n-2}$ also denoted as blocks 465. These n−2 ciphered blocks, appearing on line 467, are then combined with the n−2 lowest order ciphertext blocks $C_0, \ldots, C_{n-2}$, appearing on line 453, through exclusive-OR operation 470 on a corresponding block-by-block basis to yield, on line 472, n−2 lowest order blocks of recovered intermediate stream $\hat{Y}$, i.e., $\hat{Y}_0, \ldots, \hat{Y}_{n-2}$. The two concatenated blocks, $(\hat{Y}_{n-1}, \hat{Y}_n)$, that form the decrypted MAC are then copied, as symbolized by line 475, into two highest order blocks 482 to form a complete recovered intermediate stream, $\hat{Y}$ also denoted as 480. The entire recovered intermediate stream is processed, as symbolized by line 485, through a backward CBC, as given by equations (9)–(11) as follows, to yield recovered plaintext message, $\hat{P}$ also denoted as 490, namely $\hat{P}_0, \ldots, \hat{P}_n$:

For i=0:

$$\hat{P}_0 = \frac{F^{-1}[(\hat{Y}_0)]}{e} \qquad (9)$$

For even i within n:

$$\hat{P}_i = \frac{F^{-1}[(\hat{Y}_i) - (\hat{Y}_{i-1})]}{e} \qquad (10)$$

For odd i within n:

$$\hat{P}_i = G^{-1}[(\hat{Y}_i) - (\hat{Y}_{i-1})] \qquad (11)$$

The recovered plaintext message is identical to the incoming plaintext message, P (see FIG. 4A).

In order to verify integrity of the ciphertext, the recovered plaintext message, as shown in FIG. 4B, is then subjected to a forward CBC, in the form given by equations (3)–(5) above and symbolized by line 492, to generate a new intermediate bit stream, $\tilde{Y}$, therefrom. A recreated (recovered) MAC, denoted as 493, is formed by concatenating the two highest-order blocks of stream $\tilde{Y}$, i.e., $(\tilde{Y}_{n-1}, \tilde{Y}_n)$. The recovered MAC and the decrypted MAC, the latter appearing on line 478, are compared through comparison operation 495 to determine any discrepancies therebetween. If the values of these two MACs identically match, then the integrity of the ciphertext is confirmed—as symbolized by YES path 497; the recovered plaintext is valid. Alternatively, if any discrepancy whatsoever exists between these two values—as symbolized by NO path 498, the integrity of the ciphertext has been violated in some fashion from the time the ciphertext was first formed until its present decryption; hence, the recovered plaintext message is invalid and is to be ignored.

As noted above and discussed in detail below, stream cipher procedure 460, which includes both the stream cipher and the exclusive-OR operations, can be replaced by a backward CBC, to yield n−2 blocks of the recovered intermediate bit stream. The backward CBC, as does the stream cipher, would remove the pseudo-random sequence in the two-block encrypted MAC, residing in the highest-order two blocks of the ciphertext message, from the rest of the ciphertext message and, by so doing, yield recovered intermediate bit stream $\hat{Y}$. In this instance, the backward CBC would be implemented through equations (12)–(14) as follows:

For i=n−1:

$$\hat{Y}_{n-1} = \frac{F^{-1}[C_{n-1}]}{e} \qquad (12)$$

For even i within $0 \geq i > n-1$:

$$\hat{Y}_i = \frac{F^{-1}[(C_i) - (C_{i+1})]}{e} \qquad (13)$$

For odd i within $0 \geq i > n-1$:

$$\hat{Y}_i = G^{-1}[(C_i) - (C_{i+1})] \qquad (14)$$

We will now turn to describing flowcharts of the Encryption procedure 500 and Decryption procedure 700 that execute within, e.g., client computer 100 (see FIG. 2) to implement our present invention.

FIG. 5 depicts a flowchart of Encryption procedure 500.

Upon entry to this procedure, block 510 is first executed to calculate the value of a zero-th output block of intermediate stream, Y, as being equal to $F(eP_0)$, and a block counter, i, to the value one. Thereafter, execution enters Encryption—Forward CBC procedure 520 which, given the plaintext as input, computes the intermediate bit stream through a forward cipher block chain. In particular, execution first proceeds to block 525 which determines for block i in the plaintext stream, i.e., $P_i$, and block i−1 in the intermediate stream, i.e., $Y_{i-1}$, the value of block i in the intermediate stream, $Y_i$, depending on whether the value of counter i is then even or odd, through the use of equation (4) or (5) above, respectively. Once the value of block $Y_i$ is so determined, execution proceeds to decision block 530. This decision block determines if all n+1 blocks in the intermediate bit stream have been generated. If any such block remains to be calculated, then decision block 530 routes execution, via NO path 534, to block 535. The latter block increments the block counter by one. Execution then loops back, via path 537, to block 525 to generate the value of the next block in the intermediate stream, and so forth. Alternatively, if all such blocks have been generated, then decision block 530 routes execution, via YES path 532, out of procedure 520 and to block 540.

Block 540, when executed, encrypts the contents of the two highest-order blocks in the intermediate stream, through a pseudo-random permutation to generate the encrypted MAC. Illustratively, as noted above, this encryption is accomplished through use of DES with (a,b) as the key.

Once the encrypted MAC is produced, then execution proceeds to Encryption Stream Cipher procedure 550, and specifically first to block 555 therein. Block 555 calculates a conventional stream cipher, illustratively the RC4 stream cipher, on the lowest order n−2 blocks of the intermediate bit stream using the encrypted MAC as the seed to the cipher. Execution then proceeds to block 560 which combines, through an exclusive-OR operation, each of the resulting n−2 ciphered blocks, $S_0, \ldots, S_{n-2}$, with a corresponding block in the intermediate bit stream, $Y_0, \ldots, Y_{n-2}$, to yield the n−2 lowest order blocks of the ciphertext message, C. Once all these ciphertext blocks have been generated, execution proceeds to block 570 which, when executed, appends the concatenated two-block encrypted MAC into the ciphertext stream as the two highest order blocks therein, i.e., $C_{n-1}$ and $C_n$, thereby forming the complete ciphertext message C. Thereafter, execution proceeds to block 580 which provides the complete ciphertext message, C, as output; thereafter, execution exits from procedure 500.

Figure 6:
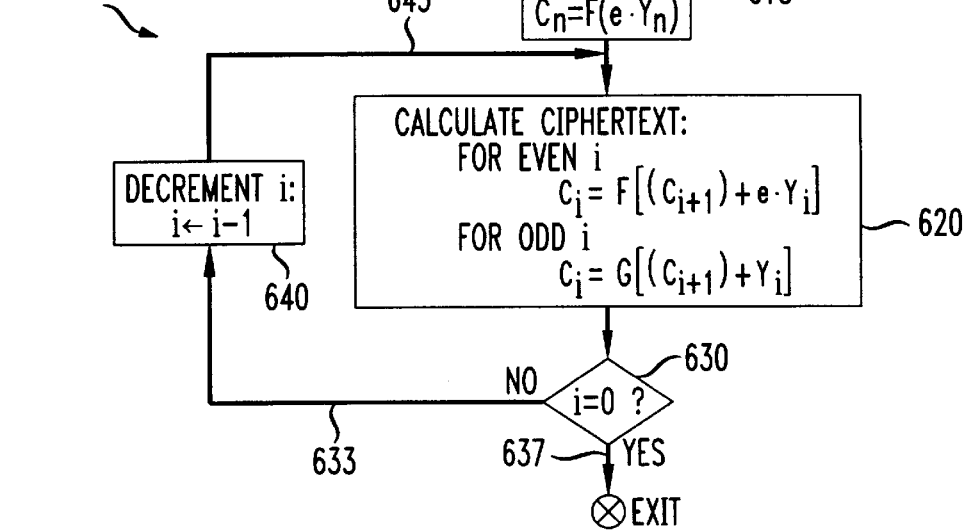
FIG. 6 depicts a flowchart of Encryption—Backward CBC procedure 600 that can be substituted for Encryption Stream Cipher procedure 550 contained within Encryption procedure 500 shown in FIG. 5.

FIG. 6 depicts a flowchart of Encryption—Backward CBC procedure 600 that can be substituted for Encryption Stream Cipher procedure 550 in Encryption procedure 500 shown in FIG. 5. As discussed above, a backward CBC can be used, during encryption, in lieu of the stream cipher and exclusive-OR operations, to extend the pseudo-random sequence in the encrypted two-block MAC, that will appear in the highest-order two blocks of the ciphertext message, across the remaining blocks of this message.

Upon entry to this procedure, block 610 is first executed to initialize a block counter, i, to a value n−1. Thereafter, block 615 executes to calculate the value of a n-th output block of ciphertext stream, $C_n$, as being equal to $F(eY_n)$. Thereafter, given the intermediate bit stream, Y, as input, block 620 determines for block i in the intermediate bit stream, i.e., $Y_i$, and the value of block i+1 in the ciphertext stream, i.e., $C_{i+1}$, the value of the corresponding block in the ciphertext stream, $C_i$, depending on whether the value of counter i is then even or odd, through the use of equation (7) or (8) above, respectively. Once the value of block $C_i$ is so determined, execution proceeds to decision block 630. This decision block determines if all n−1 blocks in the ciphertext bit stream have been generated. If any such block remains to be calculated, then decision block 630 routes execution, via NO path 633, to block 640. The latter block decrements the block counter by one. Execution then loops back, via path 645, to block 620 to generate the value of the next block in the ciphertext stream, and so forth. Alternatively, if all such blocks have been generated, then execution exits from procedure 600, via YES path 637 emanating from decision block 630.

Figure 7A:
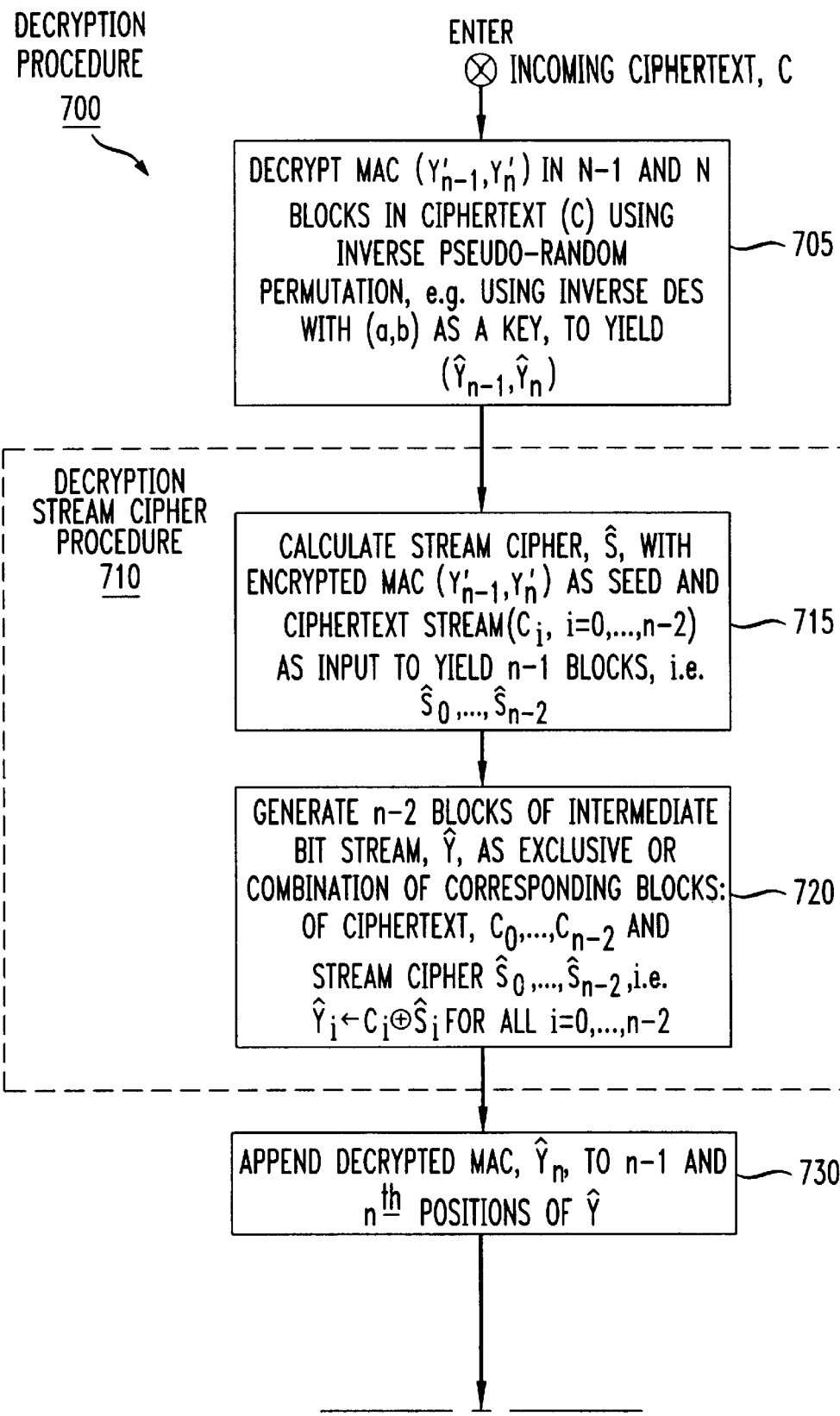

FIGS. 7A and 7B collectively depict a flowchart of Decryption procedure 700; the correct alignment of the drawing sheets for these figures is shown in FIG. 7.

Upon entry to this procedure, block 705 is first executed to decrypt the encrypted MAC, i.e., $(Y_{n-1}', Y_n')$, residing in the two highest-order blocks, i.e., $C_{n-1}$ and $C_n$, of incoming ciphertext message C. The decryption algorithm used is an inverse pseudo-random permutation of that which created the encrypted MAC, e.g., an inverse DES, with (a,b) used as the key. The resulting decrypted MAC, $(\hat{Y}_{n-1}, \hat{Y}_n)$, is then stored for subsequent use. Thereafter, execution proceeds to Decryption Stream Cipher procedure 710 and specifically first to block 715 therein. Block 715 calculates the same conventional stream cipher used in Encryption procedure 500, illustratively the RC4 stream cipher, on the lowest order n−2 blocks of the incoming ciphertext message using the encrypted MAC as the seed to the cipher. Execution then proceeds to block 720 which combines, through an exclusive-OR operation, each of the resulting n−2 ciphered blocks, $S_0, \ldots, S_{n-2}$, with a corresponding block in the incoming ciphertext bit stream, $C_0, \ldots, C_{n-2}$ to yield n−2 lowest order blocks of the recovered intermediate bit stream, $\hat{Y}$. Once all the blocks in the intermediate bit stream have been generated, execution proceeds to block 730 which, when executed, appends the concatenated two-block decrypted MAC, into the recovered intermediate bit stream as the two highest order blocks therein, i.e., $(Y_{n-1}, Y_n)$, thereby forming the complete recovered intermediate bit stream $\hat{Y}$.

Execution then proceeds to Decryption—Backward CBC procedure 740 which, given the recovered intermediate bit stream as input, computes the recovered plaintext message, $\hat{P}$, through a backward CBC. In particular, execution first proceeds to block 745 which initializes the value of block counter i to the value n. Thereafter, block 750 executes to determine, for blocks i−1 and i in the recovered intermediate bit stream plaintext message, i.e., $Y_i$ and $Y_{i-1}$, the value for block i in the recovered plaintext message, i.e., $\hat{P}_i$, depending on whether the value of counter i is then even or odd, through the use of equation (10) or (11) above, respectively. Once the value of this block is so determined, execution proceeds to decision block 760. This decision block determines if all n+1 blocks in the recovered plaintext message have been generated. If any such block remains to be calculated, then decision block 760 routes execution, via NO path 762, to block 765. The latter block decrements the block counter by one. Execution then loops back, via path 766, to block 750 to generate the value of the next block in the recovered plaintext message, and so forth. Alternatively, if all such blocks have been generated, then decision block 760 routes execution, via YES path 764, to block 767. This latter block determines the value of a zero-th output block of the recovered plaintext message in accordance with equation (9) above. Once this block is so determined, execution proceeds from procedure 740 to blocks 770–790 which collectively verify and confirm the integrity of the ciphertext message or indicate an integrity violation.

Block 770, when executed, subjects the recovered plaintext message to a forward CBC, as given by equations (3)–(5) above, to generate a new intermediate bit stream, $\tilde{Y}$, and specifically, within that stream, a recovered MAC. This block forms the recovered MAC by concatenating the two highest-order blocks of stream $\tilde{Y}$, i.e., $(\tilde{Y}_{n-1}, \tilde{Y}_n)$. Once the recovered MAC is so formed, execution proceeds to decision block 775 which tests for any discrepancies between the recovered MAC and the decrypted MAC, the latter being ($\hat{Y}_{n-1}, \hat{Y}_n$). If decision block 775 determines that the values of these two MACs identically match, then the integrity of the ciphertext is confirmed. Hence, execution proceeds, via YES path 776, to block 780. This latter block provides the recovered plaintext message as output along with an indication confirming its integrity. Alternatively, if any discrepancy whatsoever exists between the values of these two MACs, then the integrity of the ciphertext, C, has been violated in some fashion. Consequently, in this case, decision block 775 routes execution, via NO path 778, to block 790. This latter block, when executed, provides an error message indicating that the integrity of the ciphertext has been compromised and hence the recovered plaintext is invalid. Once block 780 or 790 fully executes, execution exits, via path 795, from procedure 700.

Figure 8:
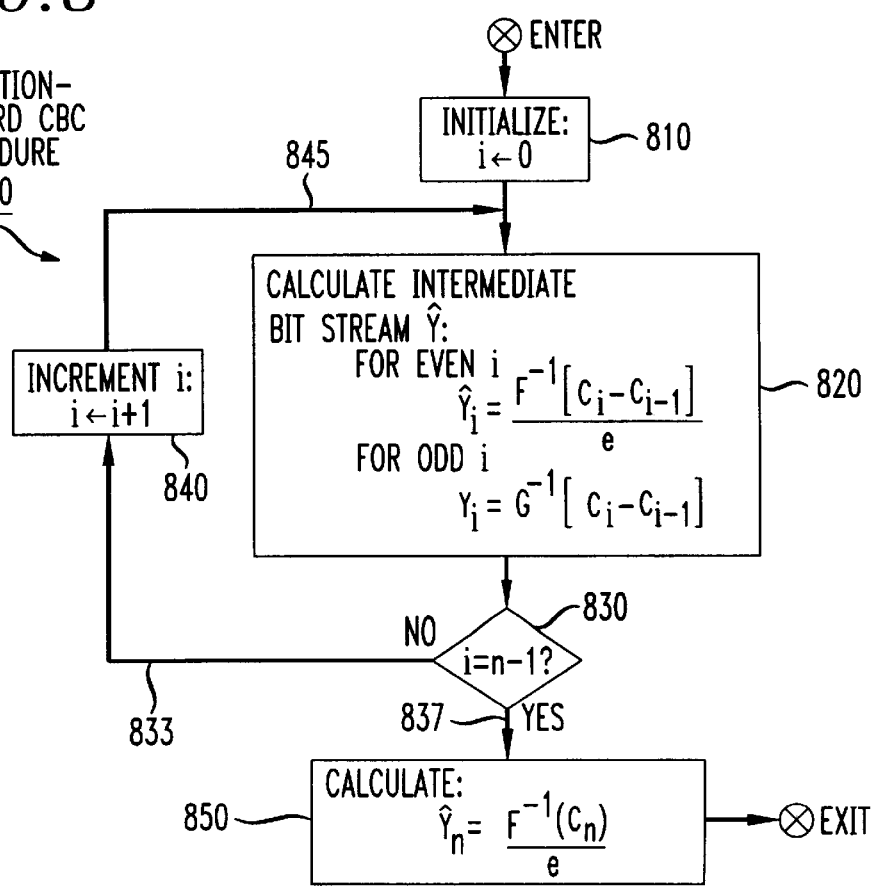
FIG. 8 depicts a flowchart of Decryption—Backward CBC procedure 800 that can be substituted for Decryption Stream Cipher procedure 710 contained within Decryption procedure 700 shown in FIGS. 7A and 7B.

FIG. 8 depicts a flowchart of Decryption—Backward CBC procedure 800 that can be substituted for Decryption Stream Cipher procedure 710 contained within Decryption procedure 700 shown in FIGS. 7A and 7B. As discussed above, a backward CBC can be used, during decryption, in lieu of the stream cipher and exclusive-OR operations, to generate n−2 lowest order blocks of the intermediate bit stream which do not contain the pseudo-random sequence that has been extended, during encryption, from the highest-order two blocks of the ciphertext message into the remainder of that message.

Upon entry to this procedure as shown in FIG. 8, block 810 is first executed to initialize a block counter (i) to zero. Thereafter, given the ciphertext stream, C, as input, block 820 determines for blocks i−1 and i in the ciphertext bit stream, i.e., $C_{i-1}$ and $C_i$, the value of block i in the recovered intermediate bit stream, $\hat{Y}_i$, depending on whether i is then even or odd, through the use of equations (13) or (14) above, respectively. Once the value of block $Y_i$ is so determined, execution proceeds to decision block 830. This decision block determines if all n−1 blocks in the recovered intermediate bit stream have been generated. If any such block remains to be calculated, then decision block 830 routes execution, via NO path 833, to block 840. The latter block decrements the block counter by one. Execution then loops back, via path 845, to block 820 to generate the value of the next block in the recovered intermediate bit stream, and so forth. Alternatively, if all such blocks have been generated, then decision block 830 directs execution, via YES path 837, to block 850. This latter block calculates the value of the n-th block of the recovered intermediate bit stream through use of equation (12). Once block 850 has executed, execution then exits from procedure 800.

As one variant of our invention, the term "e" can be replaced in certain applications by $e^{((i/2)+1)}$ or the value 1, where, e.g., for even i within n, the following equation can be used in lieu of equation (4) above:

$$Y_i = F[(Y_{i-1}) + e^{((i/2)+1)} \cdot P_i] \qquad (15)$$

Consequently, the term "e" appearing in various equations above can be generalized as $e^{\alpha}$, where α equals 0, 1 or $((i/2)+1)$.

Furthermore, though the functions $F(x_i)$ and $G(x_i)$ are alternatively employed based on the value of i, i.e., whether its current value is even or odd, both functions, in another variant of our present invention, can be used together for each i greater than zero. Consider an encryption key being composed of (a,b,c,d) (though without e) with, as discussed above, $$F(x)=ax+b \qquad (16)$$

and $$G(x)=cx+d. \qquad (17)$$

Let $Y=Y_0, Y_1, \ldots, Y_n$, as previously, but with $$Y_0=F(P_0) \text{ and} \qquad (18)$$

$$Y_i=F[Y_{i-1}+P_i] \text{ for all } n \geq i > 0. \qquad (19)$$

Let $K=K_0, K_1, \ldots, K_n$ with $$K_0=G(P_0); \text{ and} \qquad (20)$$

for $n \geq i > 0$ $$K_i=G[K_{i-1}+P_i]. \qquad (21)$$

The highest order block of the MAC becomes $Y_n=K_n$ with the remaining block of the MAC being given by equation (22) below:

$$Y_{n-1} = \sum_{k=0}^{n} K_k. \qquad (22)$$

Since the manner through which the inventive technique shown in FIGS. 4A and 4B and in detailed form in FIGS. 5–8 would be modified to utilize either of these variants should be readily apparent to anyone skilled in the art, we will not discuss either of these variants any further.

Also, those skilled in the art will realize that although the present invention has been described in terms of using 32-bit blocks, 64-bit blocks can be used instead and through the same methodology set forth above. Disadvantageously, 64-bit multiplications require four times the processing time to compute than do 32-bit multiplications. Nevertheless, with 64-bit blocks, the DES key, i.e., (a,b), will consist of a single block thereby providing a measure of programming simplification—but which is unlikely to outweigh the four-fold increase in processing time.

In addition, though the MAC (and encrypted MAC) has been described as being 64 bits in length, i.e., two 32-bit blocks, MACs of other bit (and block) sizes, such as a single 32-bit block or more than 64 bits long (but sized in integer blocks) may be used instead. Larger MACs provide greater levels of encryption, to the extent it is warranted, though at a likely cost of increased processing time to encrypt and decrypt the MAC.

In particular, though the block size (1) is preferably set at 32 bits, the size of the MAC can be readily increased from 64 bits (21) to 96 bits (31). To do so, rather than applying each block of a plaintext message, P (i.e., $P_0, P_1, \ldots, P_n$), directly as input to our inventive technique, as described above, that block could be processed through a predefined chaining operation to yield a chained plaintext message P'. Illustratively, for any input block $x_i$ where $i=0, 1, \ldots, n$, this chaining operation could be implemented as given by equation (23) below:

$$Y_i=H[x_i+Y_{i+1}] \qquad (23)$$

where: f and g are also integers and an encryption key is defined by (a,b,c,d,e,f,g) within the field Z(mod p) and $$H(x)=fx+g. \qquad (24)$$

The chained plaintext message P' would then be applied, rather than plaintext message P, as input to our inventive technique. A 96-bit MAC would be formed by appending the value of block n (i.e., $P_n'$) of the chained message as a 32-bit MAC to the 64-bit MAC (i.e., $(Y_{n-1}, Y_n)$) produced by the inventive technique to yield a 96-bit MAC (i.e., $(Y_{n-1}, Y_n, P_n')$). The resulting 96-bit MAC would then be encrypted, as described above, through conventional pseudo-random encryption and then inserted as appropriate high order blocks into an output ciphertext message. Even longer MACs can be generated in a similar fashion by processing an input message through multiple chaining operations in succession and then appending all the ensuing individual MACs that are so generated to the 64-bit MAC generated by our present inventive technique. Consequently, "plaintext", as it relates to the data that is directly applied as input to our inventive technique, collectively encompasses any such data regardless of whether it is an actual plaintext message itself or a chained plaintext message.

Although various embodiments which incorporate the teachings of the present invention have been shown and described in detail herein, those skilled in the art can readily devise many other embodiments that still utilize these teachings.

We claim:

1. A method of encrypting a plaintext message, P having n+1 blocks ($P_i$, where n>i>0 and n is an integer), into a ciphertext message such that, in response to contents of the ciphertext message itself, a subsequent violation to integrity of the ciphertext message can be detected, the method comprising the steps of:

(a) generating, in response to the plaintext message, an intermediate stream Y, having n+1 blocks ($Y_i$) with a predefined portion of the intermediate stream defining a message authentication code (MAC) through the steps of:

(a1) transforming the plaintext message, through a first predefined cipher block chaining (CBC) operation and using a key formed in response to predefined non-zero integer values a, b, c and d, into the intermediate stream; and (a2) forming the MAC as a predefined portion of the intermediate stream;

(a3) wherein the CBC is implemented according to the following so as to yield $Y_i$:

(i) for i=0, as a first function, F, of $P_0$ as input;

(ii) for even i within n, as the function, F, of $Y_{i-1}$ and $P_i$ as input; and (iii) for odd i within n, as a second function, G, of $Y_{i-1}$ and $P_i$ as input;

where: $P_0$ and $P_i$ represent blocks zero and i within the plaintext message (P), respectively, and the functions F and G comprise terms of the form ax+b and cx+d, respectively, with x representing the input to either of the functions;

(b) inserting an encrypted version of the MAC into a predefined portion of the ciphertext message; and (c) generating, in response to the intermediate stream and the encrypted MAC, a remainder of the ciphertext message such that the remainder exhibits a predefined variation contained within the encrypted MAC.

2. The method of claim 1 further comprising the steps of:

encrypting the predefined portion of the intermediate stream, through a predetermined pseudo-random permutation, into the encrypted MAC;

inserting the encrypted MAC into the predefined portion of the ciphertext message; and constructing the remainder of the ciphertext message through a second predefined cipher block chaining operation and in response to both the remainder of the intermediate stream and the encrypted MAC such that a pseudo-random sequence in the encrypted MAC, the sequence being said predefined variation, extends throughout the remainder of the ciphertext message.

3. The method in claim 2 wherein the second predefined cipher block chaining operation comprises either a backward CBC or a predefined stream cipher procedure.

4. The method in claim 3 wherein the predefined portion of the intermediate stream and the encrypted MAC are both at least 32 bits in length.

5. The method in claim 3 wherein the backward CBC is calculated according to the following equations:

for i=n−1:

$$C_{n-1}=F[e^{\alpha} \cdot Y_{n-1}],$$

for even i within $0 \geq i > n-1$:

$$C_i=F[(C_{i+1})+e^{\alpha} \cdot Y_i]$$

and for odd i within $0 \geq i > n-1$:

$$C_i=G[(C_{i+1})+Y_i]$$

where: $C_i$ and $C_{n-1}$ represent $i^{th}$ and n−$1^{st}$ blocks within the ciphertext message (C), respectively, the ciphertext message having n+1 blocks and $0 \geq i \geq n$; and the functions F and G are defined by the following equations:

$$F(x)=ax+b$$

and $$G(x)=cx+d;$$

and where: e is a predefined integer value and α equals 0, 1 or ((i/2)+1).

6. The method in claim 2 wherein encrypting step comprises the step of generating the encrypted MAC through use of DES (data encryption standard).

7. The method in claim 6 wherein the predefined portion of the intermediate stream and the encrypted MAC are both at least 32 bits in length.

8. The method in claim 2 wherein the first cipher block chaining operation is a forward CBC.

9. The method in claim 8 wherein the predefined portion of the intermediate stream and the encrypted MAC are both at least 32 bits in length.

10. The method in claim 8 wherein the constructing step further comprises the steps, provided through the stream cipher procedure of:

generating a cipher stream through a predefined stream cipher function in response to both the intermediate stream and, as a seed to the stream cipher function, the encrypted MAC; and combining, through a predetermined function, each different block of the cipher stream with a corresponding different block of the intermediate stream so as to yield a corresponding different one of the blocks of the remainder of the ciphertext message.

11. The method in claim 10 wherein the predetermined function is an exclusive-OR operation.

12. The method in claim 10 wherein the predefined stream cipher procedure is an RC4 stream cipher.

13. The method in claim 10 wherein the predefined portion of the intermediate stream and the encrypted MAC are both at least 32 bits in length.

14. The method in claim 8 wherein the forward CBC is calculated according to the following equations:

for i=0:

$$Y_0=F[e^{\alpha} \cdot P_0],$$

for even i within n:

$$Y_i=F[(Y_{i-1})+e^{\alpha} \cdot P_i] \text{ and}$$

for odd i within n:

$$Y_i=G[(Y_{i-1})+P_i]$$

where: the functions F and G are defined by the following equations:

$$F(x)=ax+b$$

and $$G(x)=cx+d;$$

and where: e is a predefined integer value and α equals 0, 1 or ((i/2)+1).

15. A computer readable medium having computer executable instructions stored therein for performing the steps of claim 14.

16. The method in claim 8 wherein the forward CBC is calculated according to the following equations, where K is a second intermediate stream having n+1 blocks, $K_i$:

for i=0:

$$Y_0=F[P_0]$$

$$K_0=G[P_0]$$

for all i, $n \geq i > 0$:

$$Y_i=F[(Y_{i-1})+P_i]; \text{ and}$$

$$K_i=G[(K_{i-1})+P_i];$$

where:

$Y_n=K_n$; and $$Y_{n-1} = \sum_{k=0}^{n} K_k;$$

and the functions F and G are defined by the following equations:

$$F(x)=ax+b \text{ and}$$

$$G(x)=cx+d.$$

17. A computer readable medium having computer executable instructions stored therein for performing the steps of claim 1.

18. A method of decrypting a ciphertext message into a recovered plaintext message ($\hat{P}$), having n+1 blocks ($\hat{P}_i$, where n≧i≧0 and n is an integer), and detecting whether integrity of the ciphertext message has been violated, the method comprising the steps of:
 (a) decrypting the ciphertext message into a recovered plaintext message comprising the steps of:
  (a1) removing, in response to an encrypted message authentication code contained in a predefined portion of the ciphertext message, a predefined variation from a remainder of the ciphertext message so as to yield an intermediate stream, the variation also being contained within the encrypted MAC; and
  (a2) determining the recovered plaintext message, as a predefined function of the intermediate stream and a decrypted version of the encrypted MAC; and
 (b) determining whether the integrity of the ciphertext message has been violated comprising the steps of:
  (b1) generating, in response to the recovered plaintext message, a recovered MAC therefrom through the steps of:
   (b1a) transforming the recovered plaintext message, through a first predefined cipher block chaining (CBC) operation and using a key formed in response to predefined non-zero integer values a, b, c and d, into an intermediate stream $\hat{Y}$ having n+1 blocks ($\hat{Y}_i$ with n≧i≧0); and
   (b1b) forming the MAC as a predefined portion of the intermediate stream;
   (b1c) wherein the CBC is implemented according to the following so as to yield $\hat{Y}_i$:
    (i) for i=0, as a first function, F, of $\hat{P}_0$ as input;
    (ii) for even i within n, as the function, F, of $\hat{Y}_{i-1}$ and $\hat{P}_i$ as input; and
    (iii) for odd i within n, as a second function, G, of $\hat{Y}_{i-1}$ and $\hat{P}_i$ as input;
   where: $\hat{P}_0$ and $\hat{P}_i$ represent block zero and i within the recovered plaintext message ($\hat{P}$), respectively, and the functions F and G comprise terms of the form ax+b and cx+d, respectively, with x representing the input to either of the functions; and
  (b2) comparing the values of the recovered MAC and the decrypted MAC so as to determine any discrepancy therebetween, whereby said discrepancy indicates that the ciphertext message has been altered prior to its decryption.

19. The method of claim 18 wherein the intermediate stream has a predefined portion and a remainder and the decrypting step further comprises the steps of:
 decrypting the predefined portion of the ciphertext message, through a predetermined inverse pseudo-random permutation, so as to yield the decrypted MAC;
 inserting the decrypted MAC into the predefined portion of the intermediate stream; and
 transforming the intermediate stream, through a second predefined cipher block chaining operation, so as to yield the recovered plaintext message; and
 the determining step further comprises the step of ascertaining, through a third predefined cipher block chaining operation and in response to the recovered plaintext message, the recovered MAC the therefrom.

20. The method in claim 19 wherein the first predefined cipher block chaining operation comprises either a backward CBC or a predefined stream cipher procedure.

21. The method in claim 20 wherein the predefined portion of the intermediate stream and the encrypted MAC are both at least 32 bits in length.

22. The method in claim 21 wherein the generating step further comprises the steps, provided through the stream cipher procedure of:
 generating a cipher stream through a predefined stream cipher function in response to both the ciphertext message and, as a seed to the stream cipher function, the encrypted MAC; and
 combining, through a predetermined function, each different block of the cipher stream with a corresponding different block of the ciphertext message so as to yield a corresponding different one of the blocks of the remainder of the intermediate stream.

23. The method in claim 22 wherein the predetermined function is an exclusive-OR operation.

24. The method in claim 22 wherein the predefined stream cipher function is an RC4 stream cipher.

25. The method in claim 22 wherein the predefined portion of the intermediate stream and the encrypted MAC are both at least 32 bits in length.

26. The method in claim 20 wherein the backward CBC is calculated according to the following equations:
 for i=n−1:

$$\hat{Y}_{n-1} = \frac{F^{-1}[C_{n-1}]}{e^{\alpha}}$$

for even i within 0≧i>n−1:

$$\hat{Y}_i = \frac{F^{-1}[(C_i) - (C_{i+1})]}{e^{\alpha}}$$

for odd i within 0≧i>n−1:

$$\hat{Y}_i = G^{-1}[(C_i) - (C_{i+1})]$$

where: $C_i$ and $C_{i+1}$ represent $i^{th}$ and $i+1^{st}$ blocks within the ciphertext message, respectively, the ciphertext message having n+1 blocks and with 0≧i≧n; and the functions F and G are defined by the following equations:

F(x)=ax+b and

G(x)=cx+d; and where: e is a predefined integer value and α equals 0, 1 or ((i/2)+1).

27. The method in claim 19 wherein the second predefined cipher block chaining operation is a backward CBC.

28. The method in claim 27 wherein the backward CBC is calculated according to the following equations:
 for i=0:

$$\hat{P}_0 = \frac{F^{-1}[(\hat{Y}_0)]}{e^{\alpha}}$$

for even i within n:

$$\hat{P}_i = \frac{F^{-1}[(\hat{Y}_i) - (\hat{Y}_{i-1})]}{e^{\alpha}}$$

for odd i within n:

$$P_i = G^{-1}[(\hat{Y}_i) - (\hat{Y}_{i-1})]$$

where: the functions F and G are defined by the following equations:

$F(x)=ax+b$ and $G(x)=cx+d$; and where: e is a predefined integer value, and $\alpha$ equals 0, 1 or $((i/2)+1)$.

29. The method in claim 28 wherein the predefined portion of the intermediate stream and the encrypted MAC are both at least 32 bits in length.

30. The method in claim 19 wherein decrypting step comprises the step of generating the decrypted MAC through use of an inverse DES (data encryption standard).

31. The method in claim 30 wherein the predefined portion of the intermediate stream and the encrypted MAC are both at least 32 bits in length.

32. The method in claim 19 wherein the third predefined cipher block chaining operation comprises a forward CBC.

33. The method in claim 32 wherein the predefined portion of the intermediate stream and the encrypted MAC are both at least 32 bits in length.

34. The method in claim 32 wherein the forward CBC is calculated according to the following equations:

for i=0:

$$\tilde{Y}_0 = F[e^\alpha \cdot \tilde{P}_0],$$

for even i within n:

$$\tilde{Y}_i = F[(\tilde{Y}_{i-1}) + e \cdot \tilde{P}_i]$$ and for odd i within n:

$$\tilde{Y}_i = G[(\tilde{Y}_{i-1}) + \tilde{P}_i]$$

where: $\tilde{Y}_0$ and $\tilde{Y}_{i-1}$ represent zero and $i-1^{st}$ blocks within a second intermediate stream, respectively, and the functions F and G are defined by the following equations:

$F(x)=ax+b$ and $G(x)=cx+d$; and where: e is a predefined integer value and $\alpha$ equals 0, 1 or $((i/2)+1)$.

35. Apparatus for encrypting a plaintext message, P having n+1 blocks ($P_i$, where n>i>0 and n is an integer), into a ciphertext message such that, in response to contents of the ciphertext message itself, a subsequent violation to integrity of the ciphertext message can be detected, the apparatus comprising:
 (a) a processor; and
 (b) a memory having said computer program stored therein, said program having computer executable instructions;
 (c) wherein, in response to the stored instructions, the processor:
  (c1) generates, in response to the plaintext message, an intermediate stream Y, having n+1 blocks ($Y_i$) with a predefined portion of the intermediate stream defining a message authentication code (MAC) by
   (c1a) transforming the plaintext message, through a first predefined cipher block chaining (CBC) operation and using a key formed in response to predefined non-zero integer values a, b, c and d, into the intermediate stream; and
   (c1b) forming the MAC as a predefined portion of the intermediate stream;
   (c1c) wherein the CBC is implemented according to the following so as to yield $Y_i$:
    (i) for i=0, as a first function, F, of $P_0$ as input;
    (ii) for even i within n, as the function, F, of $Y_{i-1}$ and $P_i$ as input; and
    (iii) for odd i within n, as a second function, G, of $Y_{i-1}$ and $P_i$ as input;
   where: $P_0$ and $P_i$ represent blocks zero and i within the plaintext message (P), respectively, and the functions F and G comprise terms of the form ax+b and cx+d, respectively, with x representing the input to either of the functions;
  (c2) inserts an encrypted version of the MAC into a predefined portion of the ciphertext message; and
  (c3) generates, in response to the intermediate stream and the encrypted MAC, a remainder of the ciphertext message such that the remainder exhibits a predefined variation contained within the encrypted MAC.

36. The apparatus of claim 35 wherein the processor, in response to the stored instructions:
 encrypts the predefined portion of the intermediate stream, through a predetermined pseudo-random permutation, into the encrypted MAC;
 inserts the encrypted MAC into the predefined portion of the ciphertext message; and
 constructs the remainder of the ciphertext message through a second predefined cipher block chaining operation and in response to both the remainder of the intermediate stream and the encrypted MAC such that a pseudo-random sequence in the encrypted MAC, the sequence being said predefined variation, extends throughout the remainder of the ciphertext message.

37. The apparatus in claim 36 wherein the first predefined cipher block chaining operation is a forward CBC.

38. The apparatus in claim 37 wherein the predefined portion of the intermediate stream and the encrypted MAC are both at least 32 bits in length.

39. The apparatus in claim 37 wherein the processor, in response to the stored instructions and through the stream cipher procedure:
 generates a cipher stream through a predefined stream cipher function in response to both the intermediate stream and, as a seed to the stream cipher function, the encrypted MAC; and
 combines, through a predetermined function, each different block of the cipher stream with a corresponding different block of the intermediate stream so as to yield a corresponding different one of the blocks of the remainder of the ciphertext message.

40. The apparatus in claim 39 wherein the predetermined function is an exclusive-OR operation.

41. The apparatus in claim 39 wherein the predefined stream cipher procedure is an RC4 stream cipher.

42. The apparatus in claim 39 wherein the predefined portion of the intermediate stream and the encrypted MAC are both at least 32 bits in length.

43. The apparatus in claim 37 wherein the forward CBC is calculated according to the following equations:

for i=0:

$$Y_0 = F[e^\alpha \cdot P_0],$$

for even i within n:

$$Y_i = F[(Y_{i-1}) + e^\alpha \cdot P_i]$$ and for odd i within n:

$$Y_i = G[(Y_{i-1}) + P_i]$$

where: the functions F and G are defined by the following equations:

$$F(x) = ax + b \text{ and}$$

$$G(x) = cx + d; \text{ and}$$

where: e is a predefined integer value and $\alpha$ equals 0, 1 or $((i/2)+1)$.

44. The apparatus in claim 37 wherein the forward CBC is calculated according to the following equations, where K is a second intermediate stream having n+1 blocks, $K_i$:

for i=0:

$$Y_0 = F[P_0]$$

$$K_0 = G[P_0]$$

for all i, n≧i>0:

$$Y_i = F[(Y_{i-1}) + P_i]; \text{ and}$$

$$K_i = G[(K_{i-1}) + P_i];$$

where:

$$Y_n = K_n; \text{ and}$$

$$Y_{n-1} = \sum_{k=0}^{n} K_k;$$

and where: $K_0$, $K_i$ and $K_n$ represent blocks 0, i and n within the second intermediate stream, respectively; and functions F and G are defined by the following equations:

$$F(x) = ax + b \text{ and}$$

$$G(x) = cx + d.$$

45. The apparatus in claim 36 wherein the second predefined cipher block chaining operation is a backward CBC or a predefined stream cipher procedure.

46. The apparatus in claim 45 wherein the predefined portion of the intermediate stream and the encrypted MAC are both at least 32 bits in length.

47. The apparatus in claim 45 wherein the backward CBC is calculated according to the following equations:

for i=n−1:

$$C_{n-1} = F[e^{\alpha} \cdot Y_{n-1}],$$

for even i within 0≧i>n−1:
$$C_i = F[(C_{i+1}) + e^{\alpha} \cdot Y_i] \text{ and}$$

for odd i within 0≧i>n−1:

$$C_i = G[(C_{i+1}) + Y_i]$$

where: $C_i$ and $C_{n-3}$ represent $i^{th}$ and n−$1^{st}$ blocks within the ciphertext message (C), respectively, the ciphertext message having n+1 blocks and 0≧i≧n; and the functions F and G are defined by the following equations:

$$F(x) = ax + b \text{ and}$$

$$G(x) = cx + d; \text{ and}$$

where: e is a predefined integer value and $\alpha$ equals 0, 1 or $((i/2)+1)$.

48. The apparatus in claim 36 wherein the processor, in response to the stored instructions, generates the encrypted MAC through use of DES (data encryption standard).

49. The apparatus in claim 48 wherein the predefined portion of the intermediate stream and the encrypted MAC are both at least 32 bits in length.

50. Apparatus for decrypting a ciphertext message into a recovered plaintext message ($\hat{P}$), having n+1 blocks ($\hat{P}_i$, where n≧i≧0 and n is an integer), and detecting whether integrity of the ciphertext message has been violated, the apparatus comprising:

(a) a processor; and
(b) a memory having said computer program stored therein, said program having computer executable instructions;
(c) wherein, in response to the stored instructions, the processor:
(c1) removes, in response to an encrypted message authentication code contained in a predefined portion of the ciphertext message, a predefined variation from a remainder of the ciphertext message so as to yield an intermediate stream, the variation also being contained within the encrypted MAC; and
(c2) determines the recovered plaintext message, as a predefined function of the intermediate stream and a decrypted version of the encrypted MAC;
(c3) generates, in response to the recovered plaintext message, a recovered MAC therefrom through:
(c3a) transforming the recovered plaintext message, through a first predefined cipher block chaining (CBC) operation and using a key formed in response to predefined non-zero integer values a, b, c and d, into an intermediate stream $\hat{Y}$ having n+1 blocks ($\hat{Y}_i$ with n≧i≧0); and
(c3c) forming the MAC as a predefined portion of the intermediate stream;
wherein the CBC is implemented according to the following so as to yield $Y_i$:
(i) for i=0, as a first function, F, of $\hat{P}_0$ as input;
(ii) for even i within n, as the function, F, of $\hat{Y}_{i-1}$ and $\hat{P}_i$ as input; and
(iii) for odd i within n, as a second function, G, of $\hat{Y}_{i-1}$ and $\hat{P}_i$ as input;
where: $\hat{P}_0$ and $\hat{P}_i$ represent block zero and i within the recovered plaintext message ($\hat{P}$), respectively, and the functions F and G comprise terms of the form ax+b and cx+d, respectively, with x representing the input to either of the functions; and
(c4) compares the values of the recovered MAC and the decrypted MAC so as to determine any discrepancy therebetween, whereby said discrepancy indicates that the ciphertext message has been altered prior to its decryption.

51. The apparatus of claim 50 wherein the intermediate stream has a predefined portion and a remainder, and the processor, in response to the stored instructions:

decrypts the predefined portion of the ciphertext message, through a predetermined inverse pseudo-random permutation, so as to yield the decrypted MAC;
inserts the decrypted MAC into the predefined portion of the intermediate stream;

transforms the intermediate stream, through a second predefined cipher block chaining operation, so as to yield the recovered plaintext message; and ascertains, through a third predefined cipher block chaining operation and in response to the recovered plaintext message, the recovered MAC therefrom.

52. The apparatus in claim 51 wherein the first predefined cipher block chaining operation comprises either a backward CBC or a predefined stream cipher procedure.

53. The apparatus in claim 52 wherein the predefined portion of the intermediate stream and the encrypted MAC are both at least 32 bits in length.

54. The apparatus in claim 52 wherein the backward CBC is calculated according to the following equations:

for i=n−1:

$$\hat{Y}_{n-1} = \frac{F^{-1}[C_{n-1}]}{e^\alpha}$$

for even i within $0 \geq i > n-1$:

$$\hat{Y}_i = \frac{F^{-1}[(C_i)-(C_{i+1})]}{e^\alpha}$$

for odd i within $0 \geq i > n-1$:

$$\hat{Y}_i = G^{-1}[(C_i)-(C_{i+1})]$$

where: $C_i$ and $C_{i+1}$ represent $i^{th}$ and $i+1^{st}$ blocks within the ciphertext message, respectively, the ciphertext message having n+1 blocks and with $0 \geq i \geq n$; and the functions F and G are defined by the following equations:

$F(x)=ax+b$ and $G(x)=cx+d$; and where: e is a predefined integer value and $\alpha$ equals 0, 1 or ((i/2)+1).

55. The apparatus in claim 51 wherein the second predefined cipher block chaining operation is a backward CBC.

56. The apparatus in claim 55 wherein the predefined portion of the intermediate stream and the encrypted MAC are both at least 32 bits in length.

57. The apparatus in claim 51 wherein the backward CBC is calculated according to the following equations:

For i=0:

$$\hat{P}_0 = \frac{F^{-1}[(\hat{Y}_0)]}{e^\alpha}$$

For even i within n:

$$\hat{P}_i = \frac{F^{-1}[(\hat{Y}_i)-(\hat{Y}_{i-1})]}{e^\alpha}$$

For odd i within n:

$$\hat{P}_i = G^{-1}[(\hat{Y}_i)-(\hat{Y}_{i-1})]$$

where: the functions F and G are defined by the following equations:

$F(x)=ax+b$ and $G(x)=cx+d$; and where: e is a predefined integer value and $\alpha$ equals 0, 1 or ((i/2)+1).

58. The apparatus in claim 52 wherein the processor, in response to the stored instructions:

generates a cipher stream through a predefined stream cipher function in response to both the ciphertext message and, as a seed to the stream cipher function, the encrypted MAC; and combines, through a predetermined function, each different block of the cipher stream with a corresponding different block of the ciphertext message so as to yield a corresponding different one of the blocks of the remainder of the intermediate stream.

59. The apparatus in claim 58 wherein the predetermined function is an exclusive-OR operation.

60. The apparatus in claim 58 wherein the predefined stream cipher procedure is an RC4 stream cipher.

61. The apparatus in claim 58 wherein the predefined portion of the intermediate stream and the encrypted MAC are both at least 32 bits in length.

62. The apparatus in claim 58 wherein the processor, in response to the stored instructions, generates the decrypted MAC through use of an inverse DES (data encryption standard).

63. The apparatus in claim 62 wherein the predefined portion of the intermediate stream and the encrypted MAC are both at least 32 bits in length.

64. The apparatus in claim 51 wherein the third predefined cipher block chaining operation comprises a forward CBC.

65. The apparatus in claim 64 wherein the predefined portion of the intermediate stream and the encrypted MAC are both at least 32 bits in length.

66. The apparatus in claim 64 wherein the forward CBC is calculated according to the following equations:

for i=0:

$$\tilde{Y}_0 = F[e^\alpha \cdot \hat{P}_0],$$

for even i within n:

$$\tilde{Y}_i = F[(\tilde{Y}_{i-1})+e^\alpha \cdot \hat{P}_i] \text{ and}$$

for odd i within n:

$$\tilde{Y}_i = G[(\tilde{Y}_{i-1})+\hat{P}_i]$$

where: $\tilde{Y}_0$ and $\tilde{Y}_{i-1}$ represent zero and $i-1^{st}$ blocks within a second intermediate stream, respectively, and functions F and G are defined by the following equations:

$F(x)=ax+b$ and $G(x)=cx+d$; and where: e is a predefined integer value and $\alpha$ equals 0, 1 or ((i/2)+1).

* * * * *